US005772912A

United States Patent [19]
Lockyer et al.

[11] Patent Number: 5,772,912
[45] Date of Patent: Jun. 30, 1998

[54] ENVIRONMENTALLY FRIENDLY ANTI-ICING

[75] Inventors: Robert T. Lockyer, Los Gatos; John Zuk, San Jose; Leonard A. Haslim, Hayward, all of Calif.

[73] Assignee: The United States of America as represented by the Administrator of the National Aeronautics and Space Administration, Washington, D.C.

[21] Appl. No.: 605,295

[22] Filed: Jan. 24, 1996

Related U.S. Application Data

[63] Continuation-in-part of Ser. No. 380,913, Jan. 25, 1995, abandoned.

[51] Int. Cl.$^6$ ........................................ C09K 3/18
[52] U.S. Cl. .............................. 252/70; 106/13
[58] Field of Search ............................ 106/13; 252/70

[56] References Cited

U.S. PATENT DOCUMENTS

| | | | |
|---|---|---|---|
| 2,101,472 | 12/1937 | Kormann | 134/27 |
| 2,373,727 | 4/1945 | West et al. | 108/13 |
| 2,454,886 | 11/1948 | Sapiro | 106/128 |
| 2,716,067 | 8/1955 | Fain et al. | 106/13 |
| 2,716,068 | 8/1955 | Fain et al. | 106/13 |
| 2,923,692 | 2/1960 | Ackerman | 260/17.4 |
| 3,350,314 | 10/1967 | Dawtrey et al. | 252/70 |
| 3,362,910 | 1/1968 | Ordeit et al. | 252/75 |
| 3,557,016 | 1/1971 | Schuppner | 252/316 |
| 3,624,243 | 11/1971 | Scott, Jr. et al. | 252/70 |
| 3,630,913 | 12/1971 | Scott, Jr. et al. | 252/70 |
| 3,940,356 | 2/1976 | Byrnes | 260/92.6 E |
| 4,358,389 | 11/1982 | Konig-Lumer et al. | 252/70 |
| 4,439,337 | 3/1984 | Nimerick et al. | 252/70 |
| 4,501,775 | 2/1985 | Parks et al. | 427/220 |
| 4,585,571 | 4/1986 | Bloom | 252/70 |
| 4,606,835 | 8/1986 | Lieber et al. | 252/70 |
| 4,606,836 | 8/1986 | Gancy | 252/70 |
| 4,606,837 | 8/1986 | McEntire et al. | 252/73 |
| 4,698,172 | 10/1987 | Tye et al. | 252/70 |
| 4,744,913 | 5/1988 | Salvador et al. | 252/70 |
| 4,824,588 | 4/1989 | Lin | 252/70 |
| 4,954,279 | 9/1990 | Ma et al. | 252/70 |
| 5,104,711 | 4/1992 | Marsek | 428/78 |
| 5,135,674 | 8/1992 | Kuhajek et al. | 252/70 |
| 5,290,768 | 3/1994 | Ramsay et al. | 428/78 |
| 5,420,015 | 5/1995 | Wuerch | 106/162 |

FOREIGN PATENT DOCUMENTS

| | | |
|---|---|---|
| 257720 | 3/1988 | European Pat. Off. . |
| 646634 | 4/1995 | European Pat. Off. . |
| 15 34 17 3 | 3/1965 | Germany . |
| 15 19 00 9 | 2/1969 | Germany . |
| 1044678 | 3/1969 | United Kingdom . |
| WO 94 05741 | 3/1994 | WIPO . |

OTHER PUBLICATIONS

N.H. Proctor et al. Chemical Hazards in the Workplace, 2nd ed., J.B. Lippencott Co., Philadelphia, PA, p. 494 (1988).
Kirk–Othmer: Encyclopedia of Chemical Technology, vol. 12, 3rd Ed., John Wiley and Sons Inc., (1980), p. 62.
Merck Index, Merck & Co. Inc., 1989, p. 1586.
Hackh's Chemical Dictionary, Mc Graw–Hill Book co., 1990 (p. 787).
S.I. Hartnell, et al. "Toxicity of Aircraft De–Icer and Anti--Icer Solutions on Aquatic Organisms," Maryland Department of Natural Resources, Tidewater Administration, Chesapeake Bay Research and Monitoring Division, Fisheries Division May 1993.
"Biodegradation of Toxicity of Glycols," ARCO Chemical Company, 3801 West Chester Pike, Newton Square, PA 19073.
Brigadier General James E. McCarthy, "Prohibition on Purchase of Environmentally Hazardous Deicing Chemicals,"(Memo), Department of the Air Force (Mar. 31, 1992).
S.I. Hartwell al., "Toxicity of Aircraft De–Icer and Anti–Icer Solutions to Aquatic Organisms, *Environmental Toxicology and chemistry*," vol. 14 (#8), pp. 1375–1386.

*Primary Examiner*—Anthony Green
*Attorney, Agent, or Firm*—Kenneth L. Warsh; Harry Lupuloff; John G. Mannix

[57] ABSTRACT

The present invention describes an aqueous, non-electrolytic, non-toxic, biodegradable, continuous single phase liquid anti-icing or deicing composition for use on the surfaces of, for example, aircraft, airport pavements, roadways, walkways, bridges, entrances, structures, canals, locks, components, vessels, nautical components, railroad switches, and motor vehicles. The anti-icing or deicing composition comprises: (a) water; (b) a non-toxic freezing point depressant selected from the group consisting of monohydric alcohols having from 2 to 6 carbon atoms, polyhydric alcohols having from 3 to 12 carbon atoms, monomethyl or ethyl ethers of polyhydric alcohols having from 3 to 12 atoms or mixtures thereof, wherein the freezing point depressant present is between about 14 to 60 percent by weight; (c) a thickener which is present in between about 0.01 and 10 percent by weight; and (d) optionally a corrosion inhibitor which is present in between about 0.01 and 0.1 percent by weight of the total composition. In one embodiment, the deicing composition further includes (e) a monohydric primary aliphatic unbranched alcohol as a means of forming a thin layer of the composition on the surface of the structure to be given ice protection, and/or as means of forming a homogenized foam with xanthan thickener; which alcohol is selected from the group consisting of alcohols having between 8 to 24 carbon atoms, preferably, 1-dodecanol. Compositions of water, propylene glycol, and/or propanol and xanthan are preferred.

42 Claims, 20 Drawing Sheets

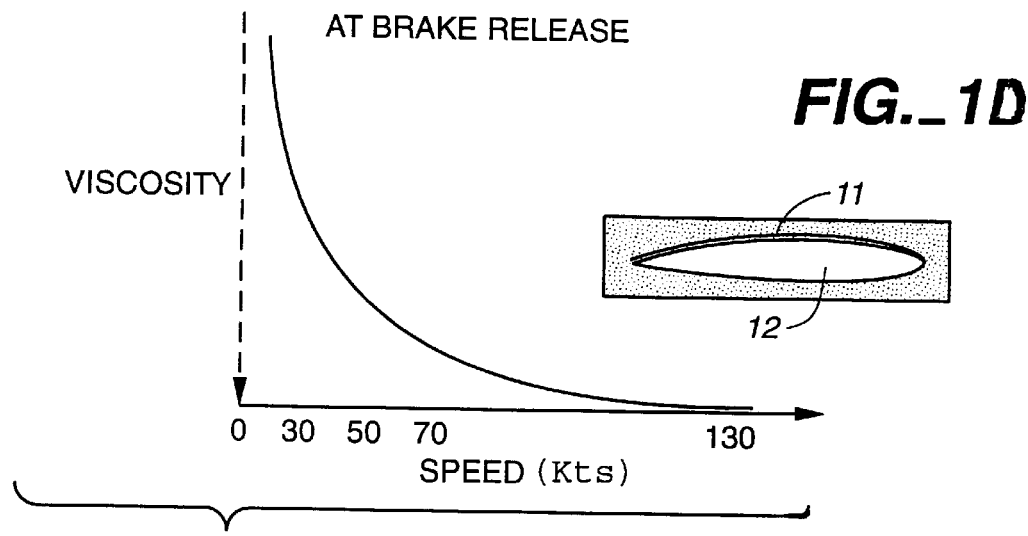
FIG._1A
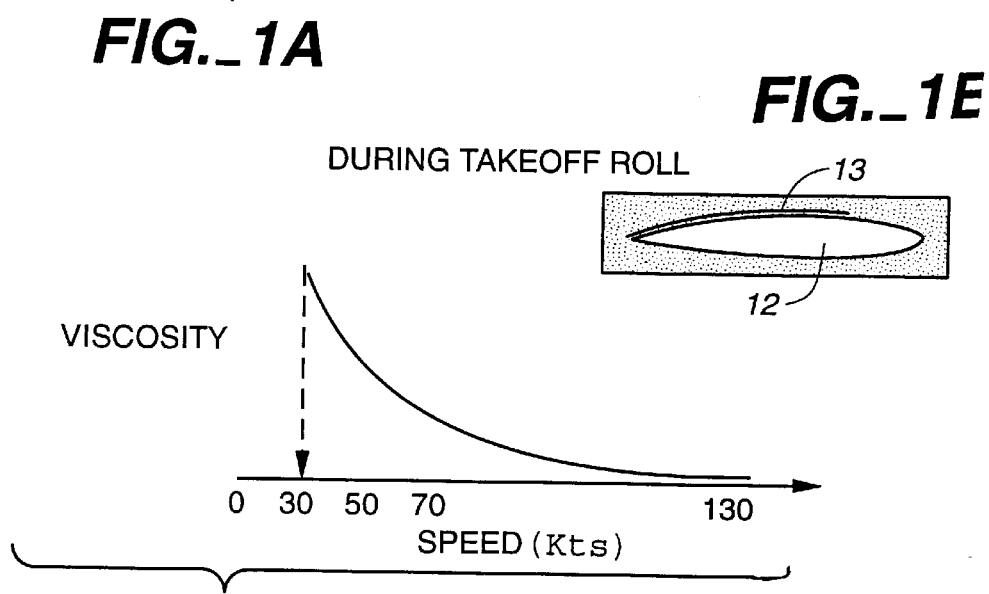
FIG._1B
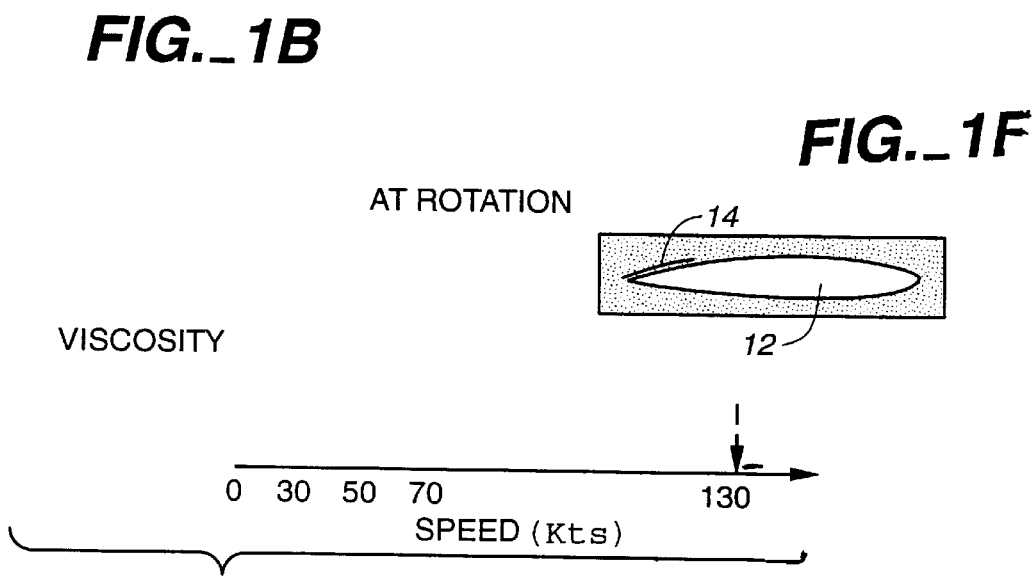
FIG._1C

**NEWTONIAN FLUID
TYPE I. UNTHICKENED**

| PRINCIPLE OF OPERATION |
|---|
| FPD - STOPS FREEZING |

NO YIELD VALUE

◄——— HIGH FLOW ———►

FIG._2   SHEAR RATE, $\dot{\gamma}$

VISCOSITY, $\eta$

**NON-NEWTONIAN FLUID
TYPE II. THICKENED**

LOW FLOW

| PRINCIPLE OF OPERATION |
|---|
| FPD - STOPS FREEZING |
| THICKENER - KEEPS FPD ON AEROFOIL |

PSEUDOPLASTIC FLUID

HIGH FLOW

FIG._3   SHEAR RATE, $\dot{\gamma}$

VISCOSITY, $\eta$

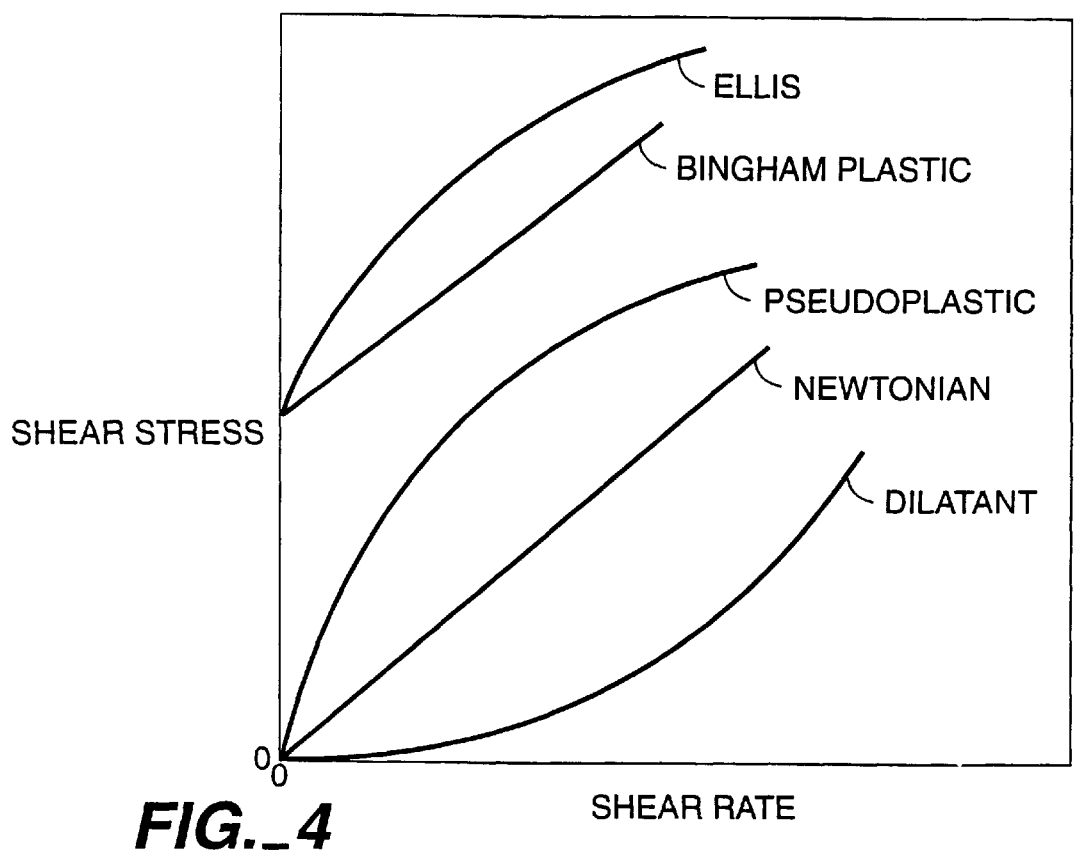
FIG._4
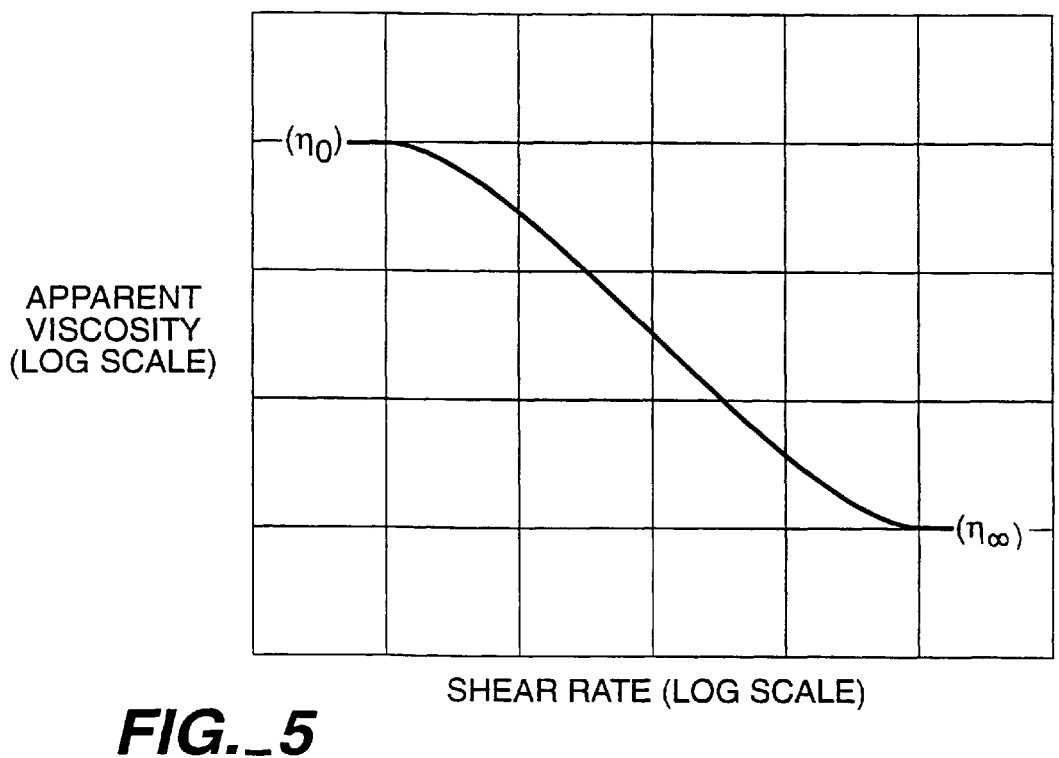
FIG._5

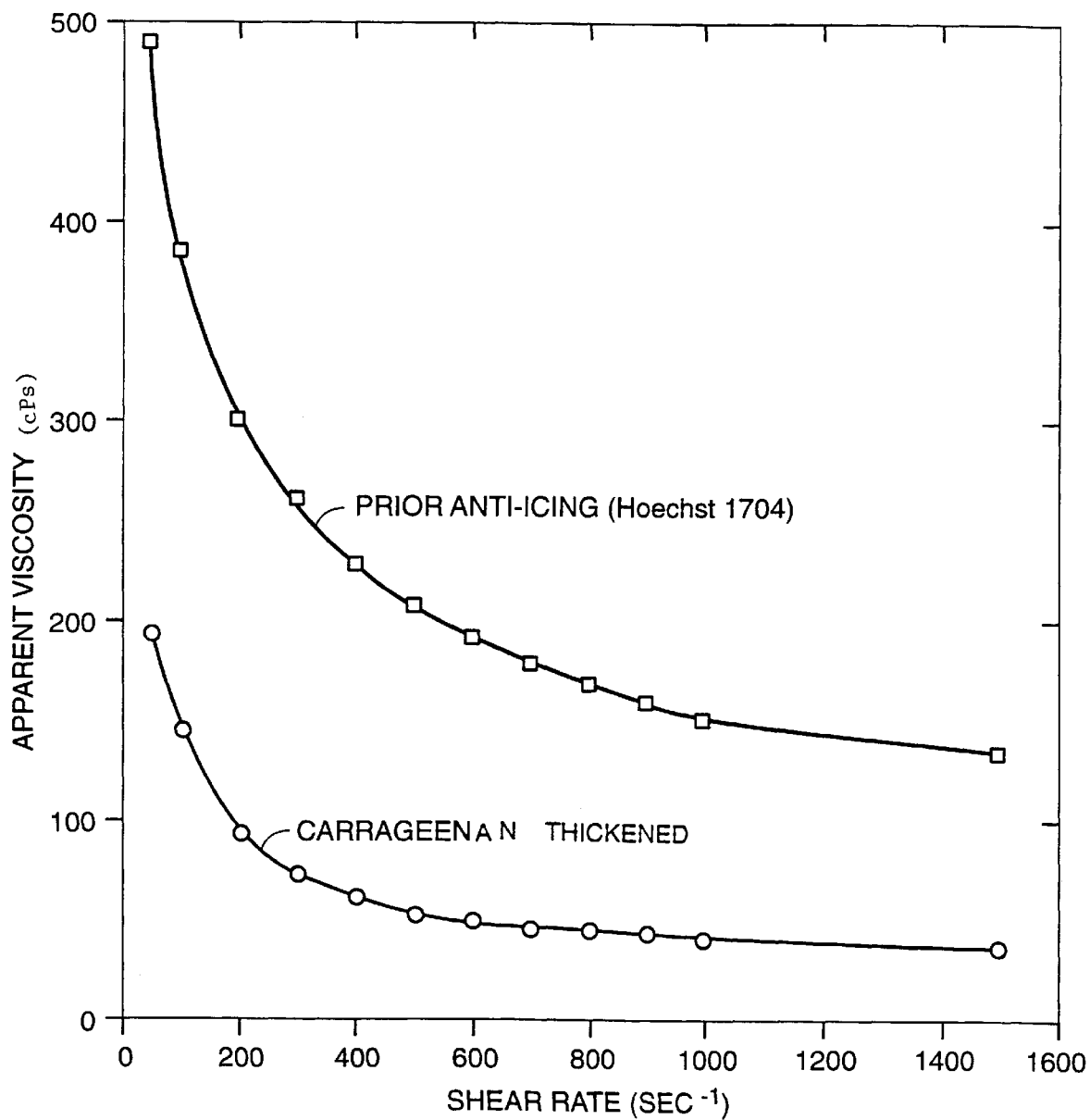
FIG._6

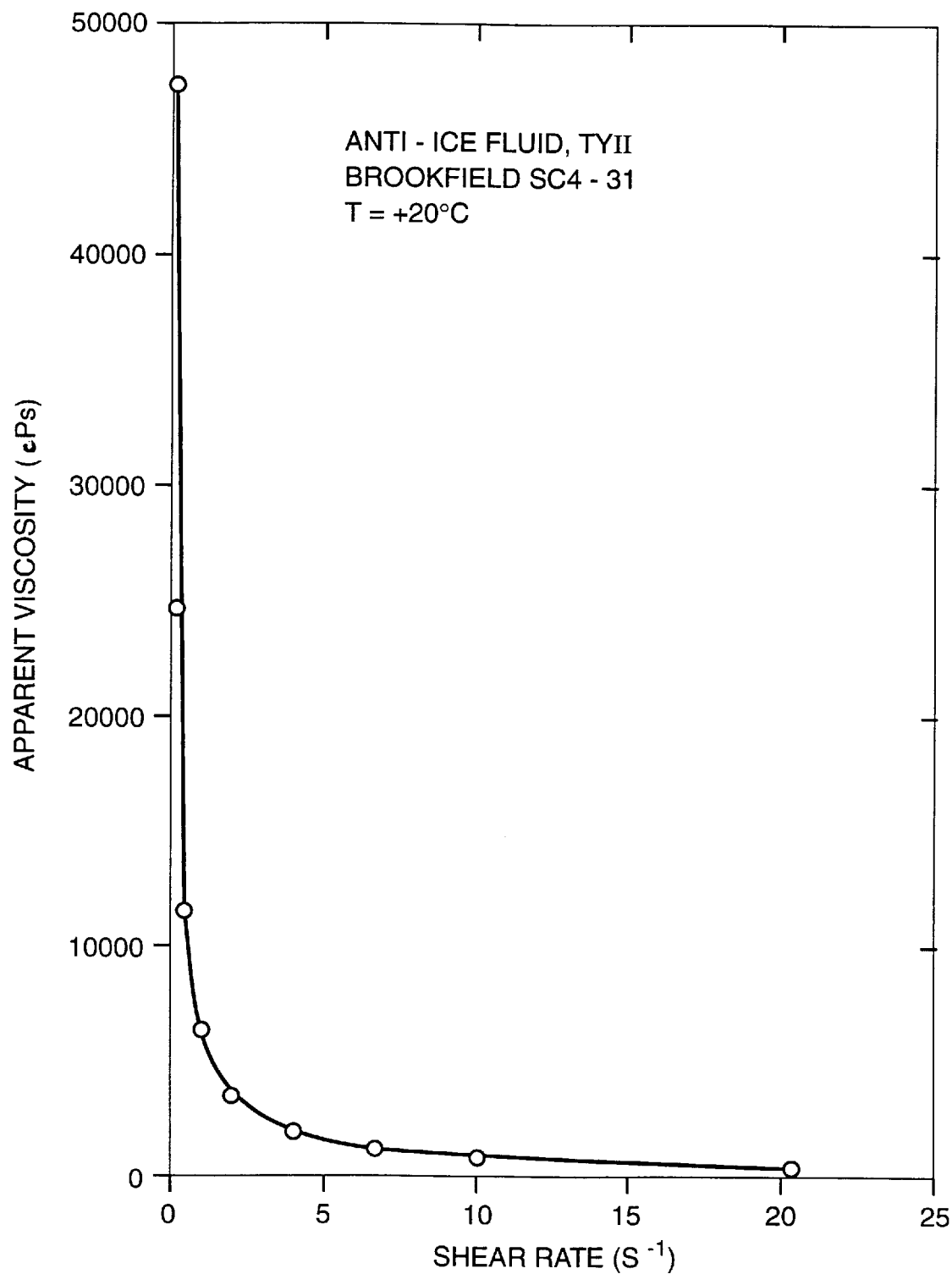
FIG._7

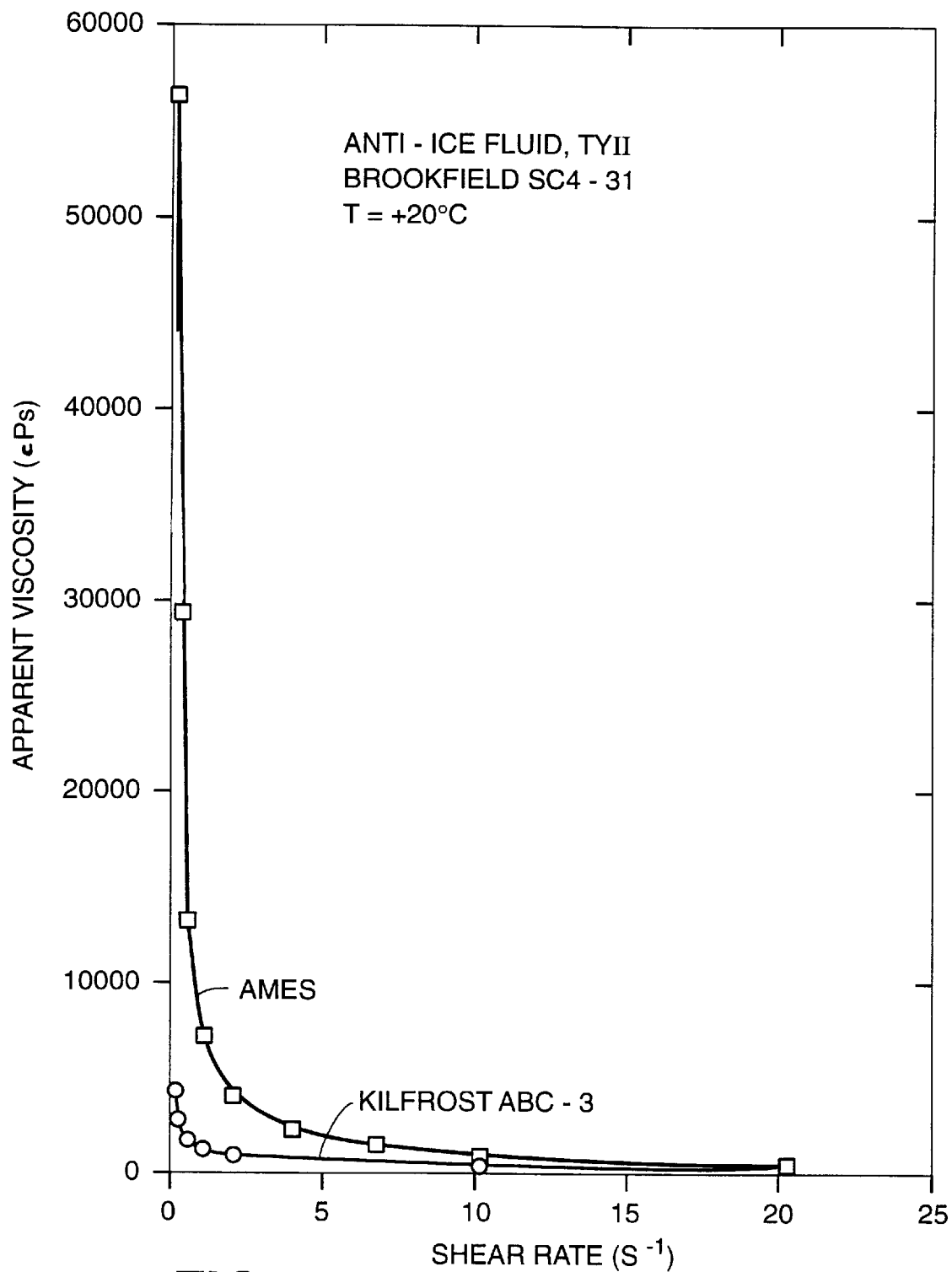
FIG._8

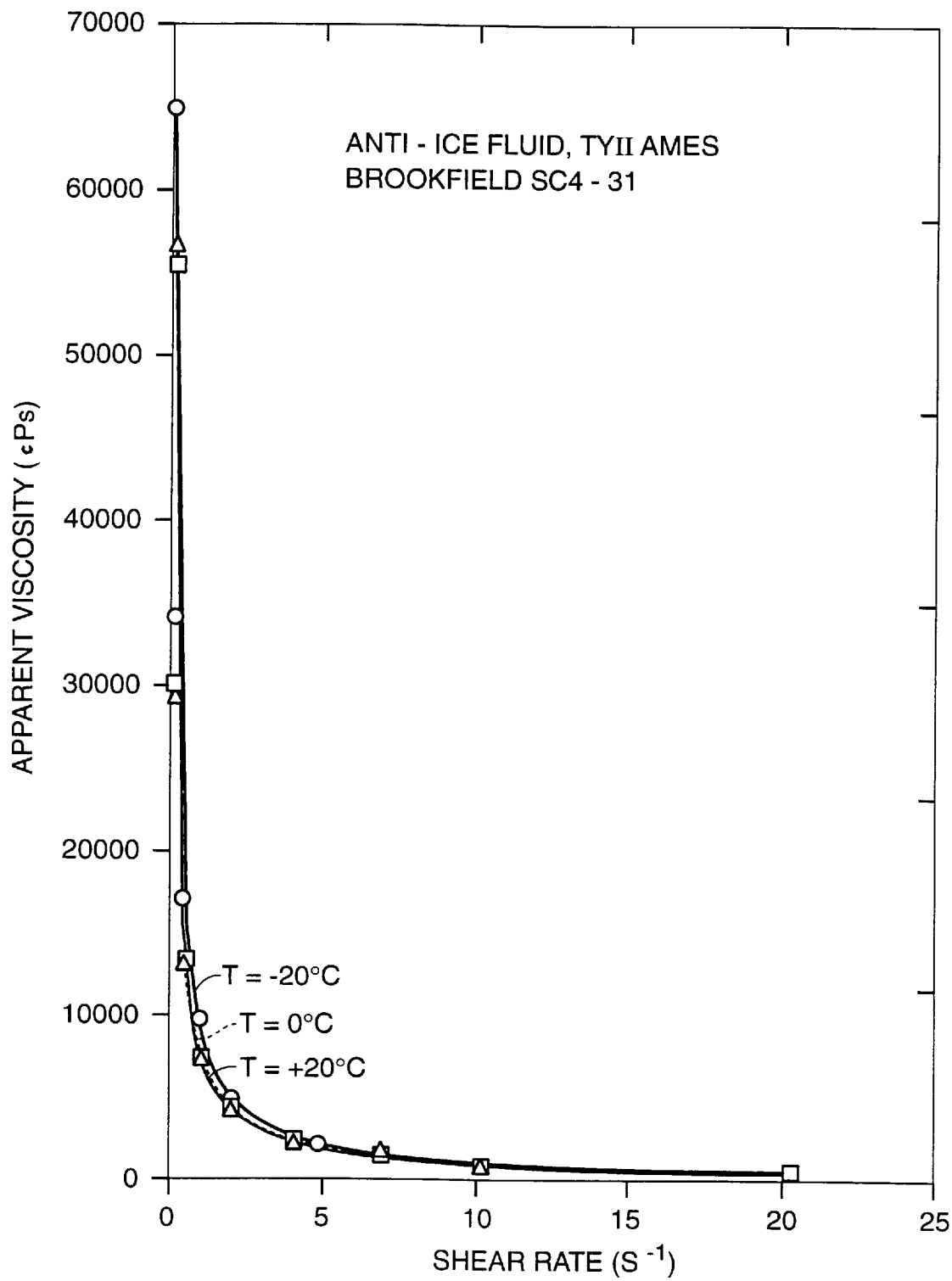
FIG._9

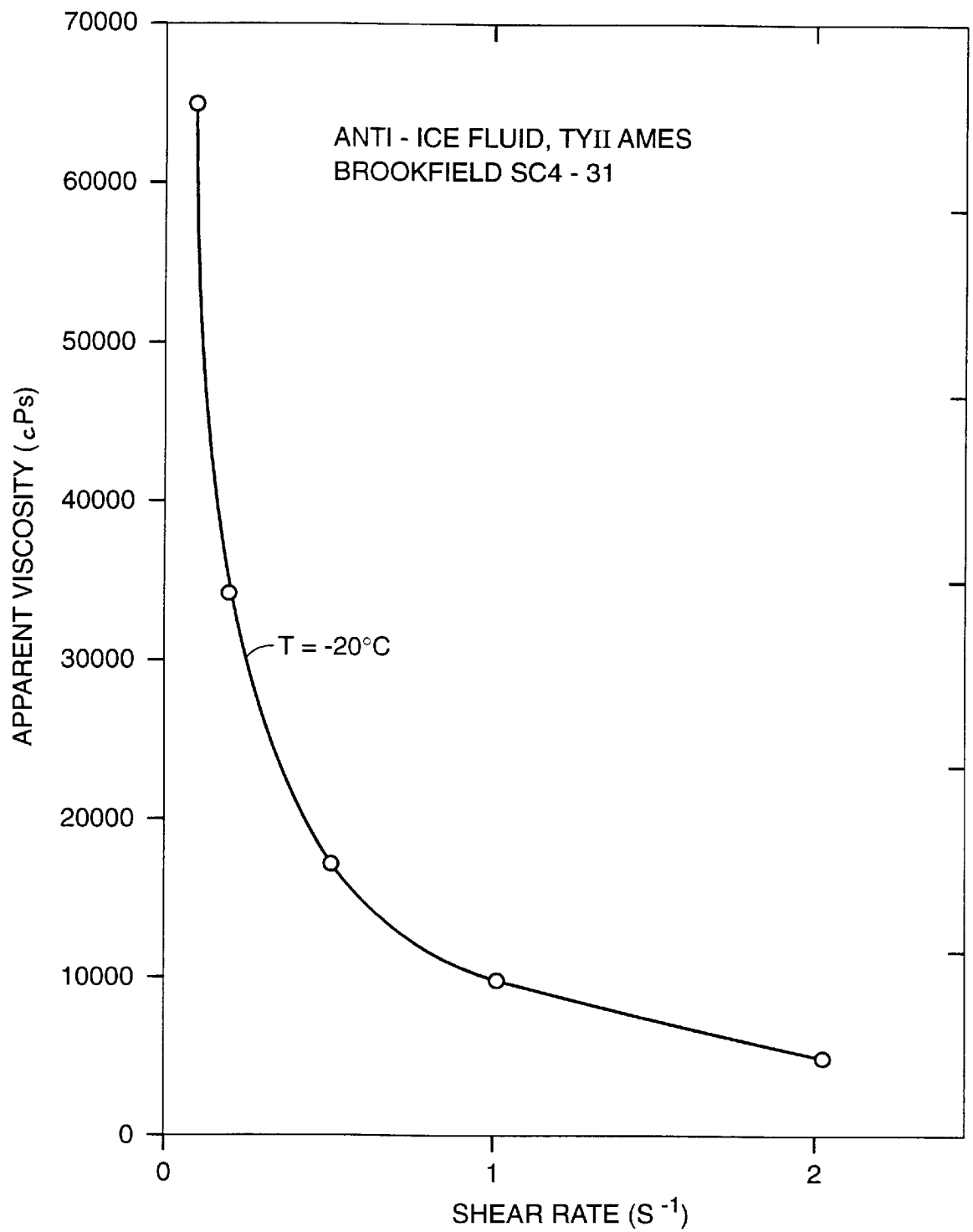
FIG._10

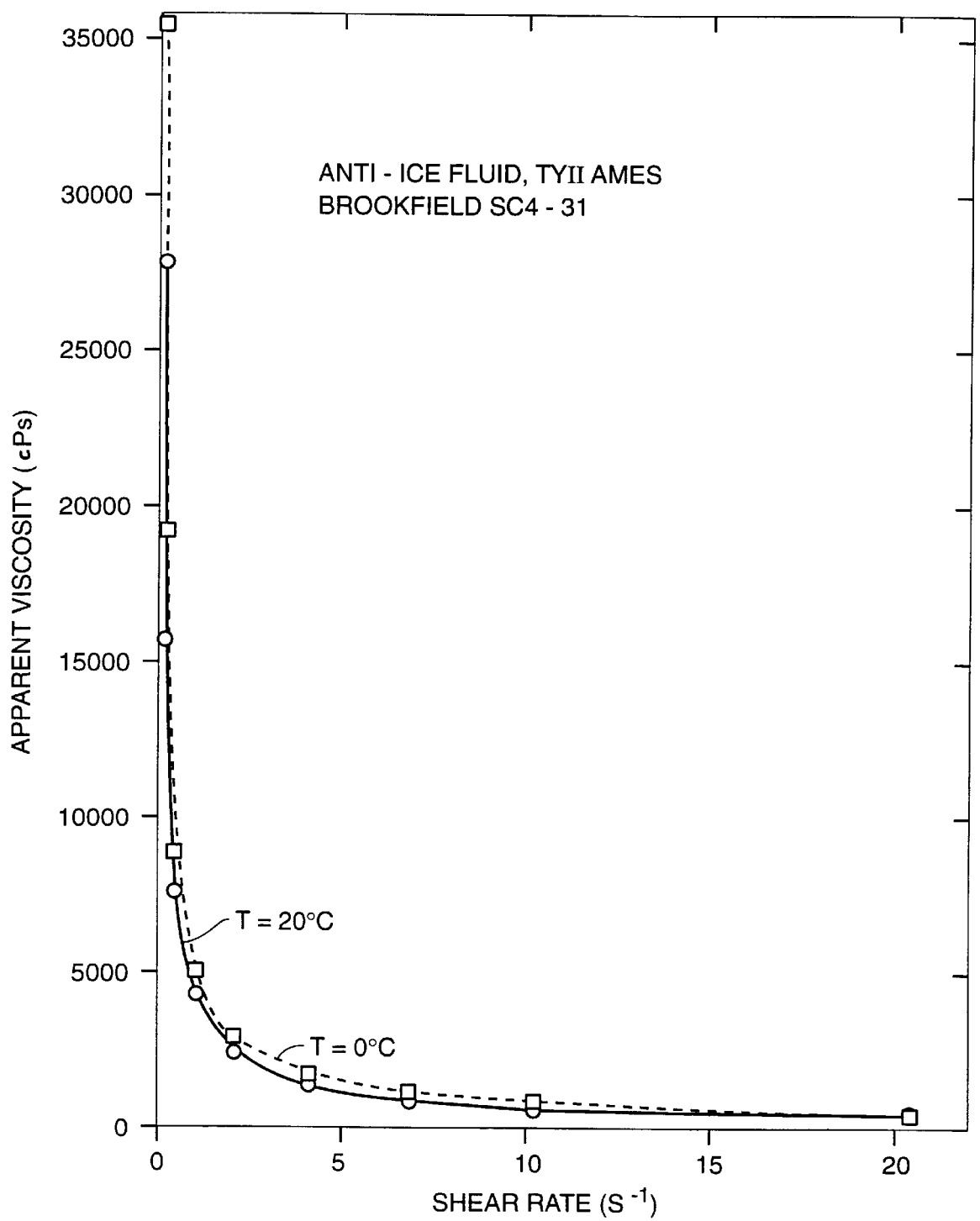
FIG._11

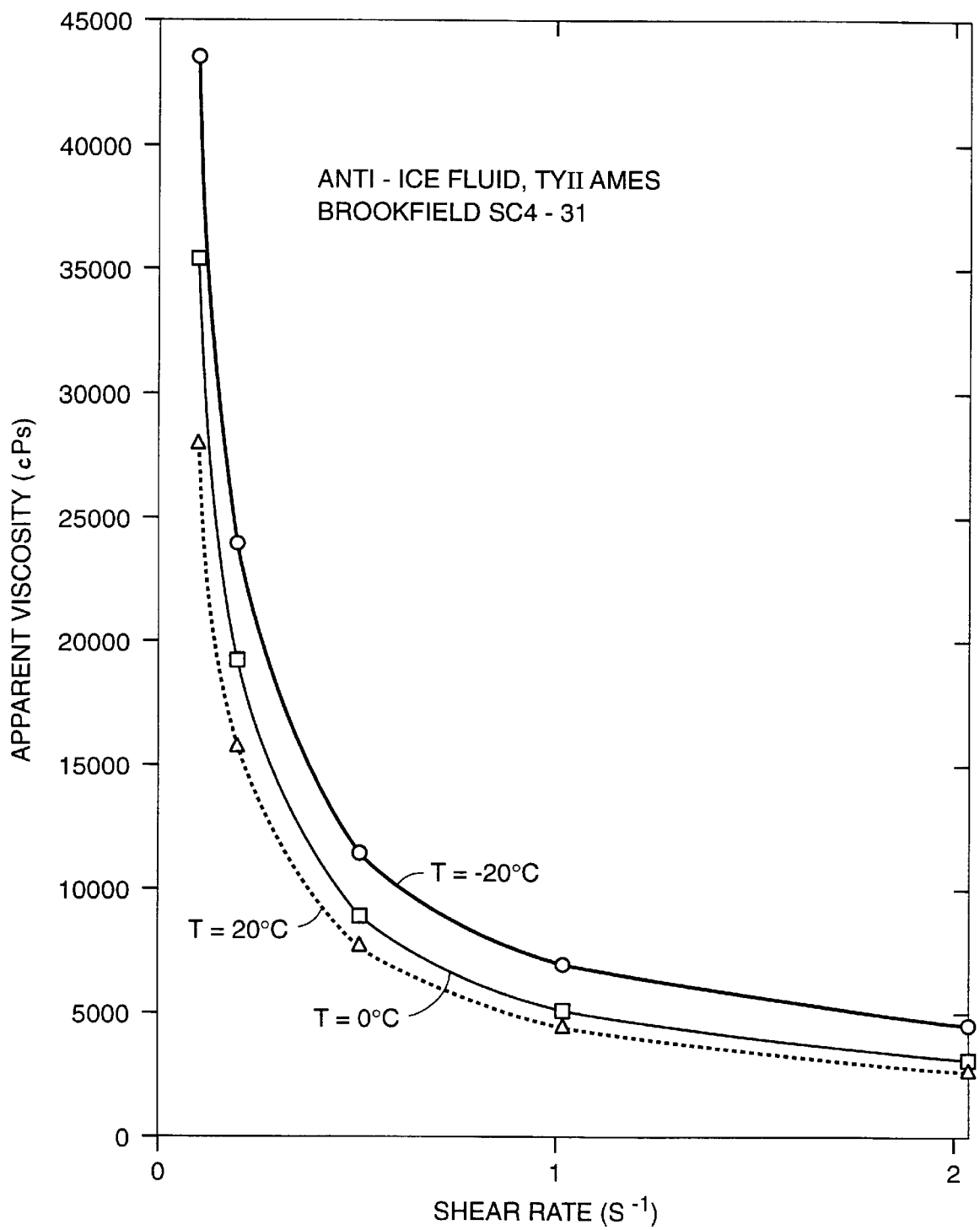
FIG._12

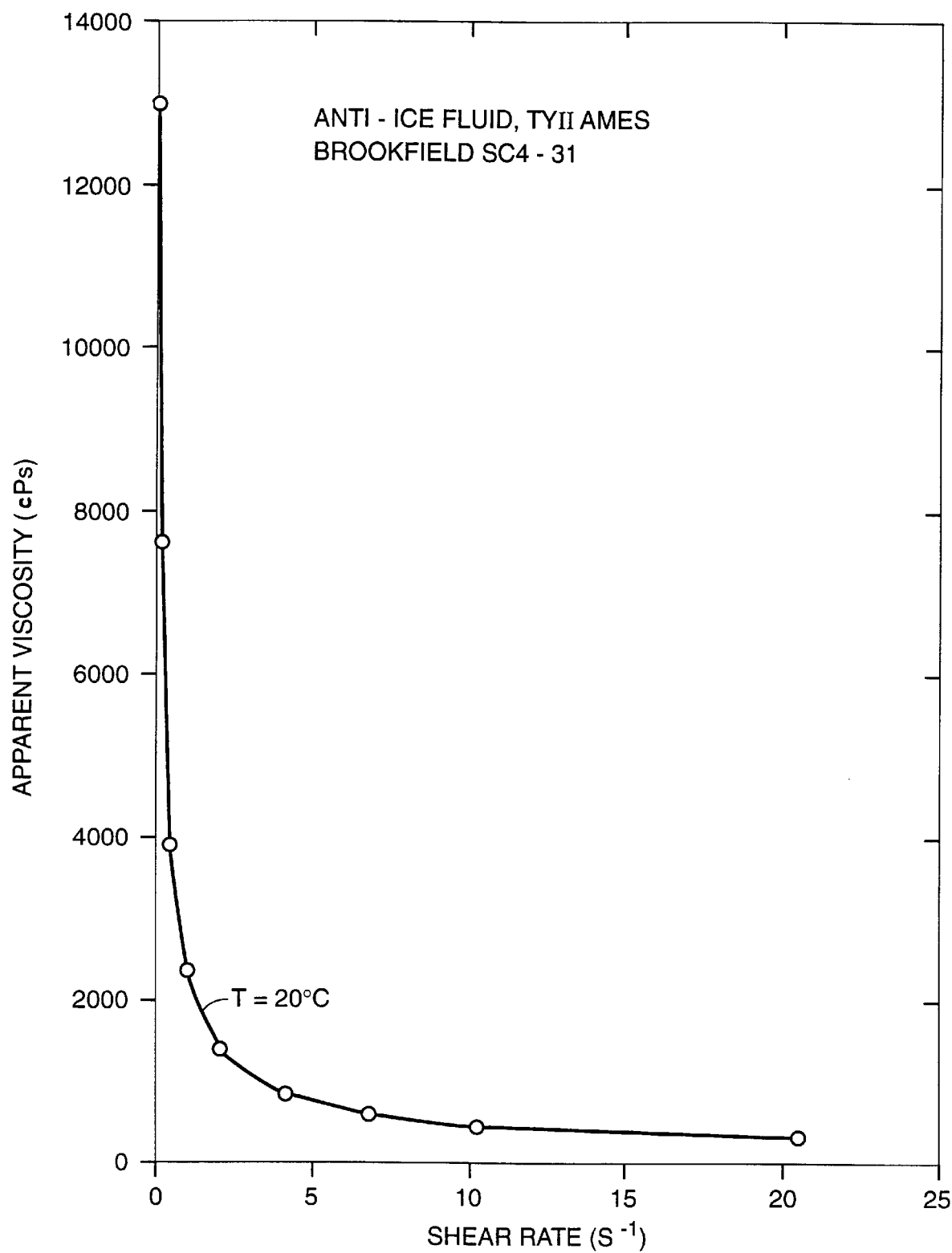
FIG._13

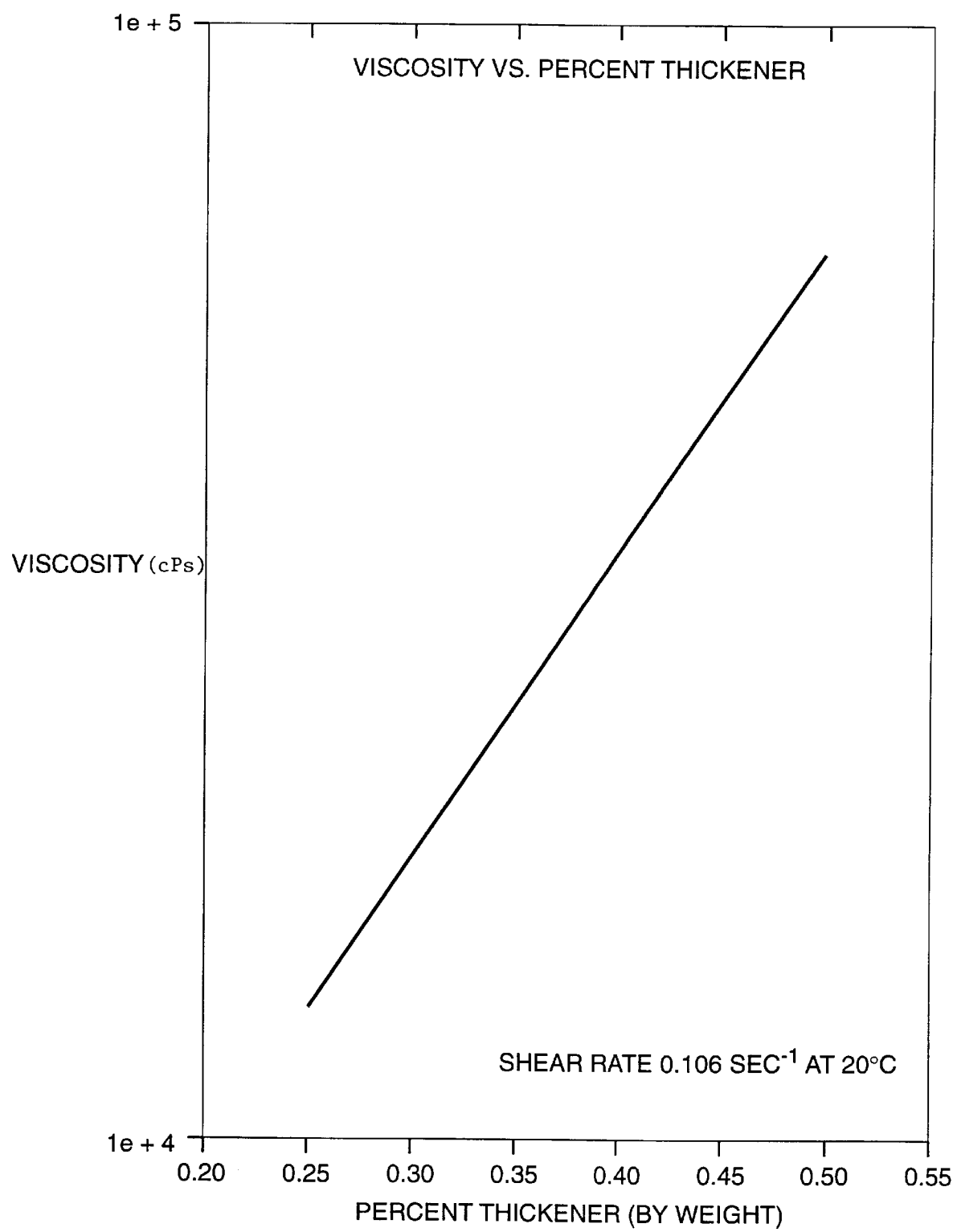
FIG._14

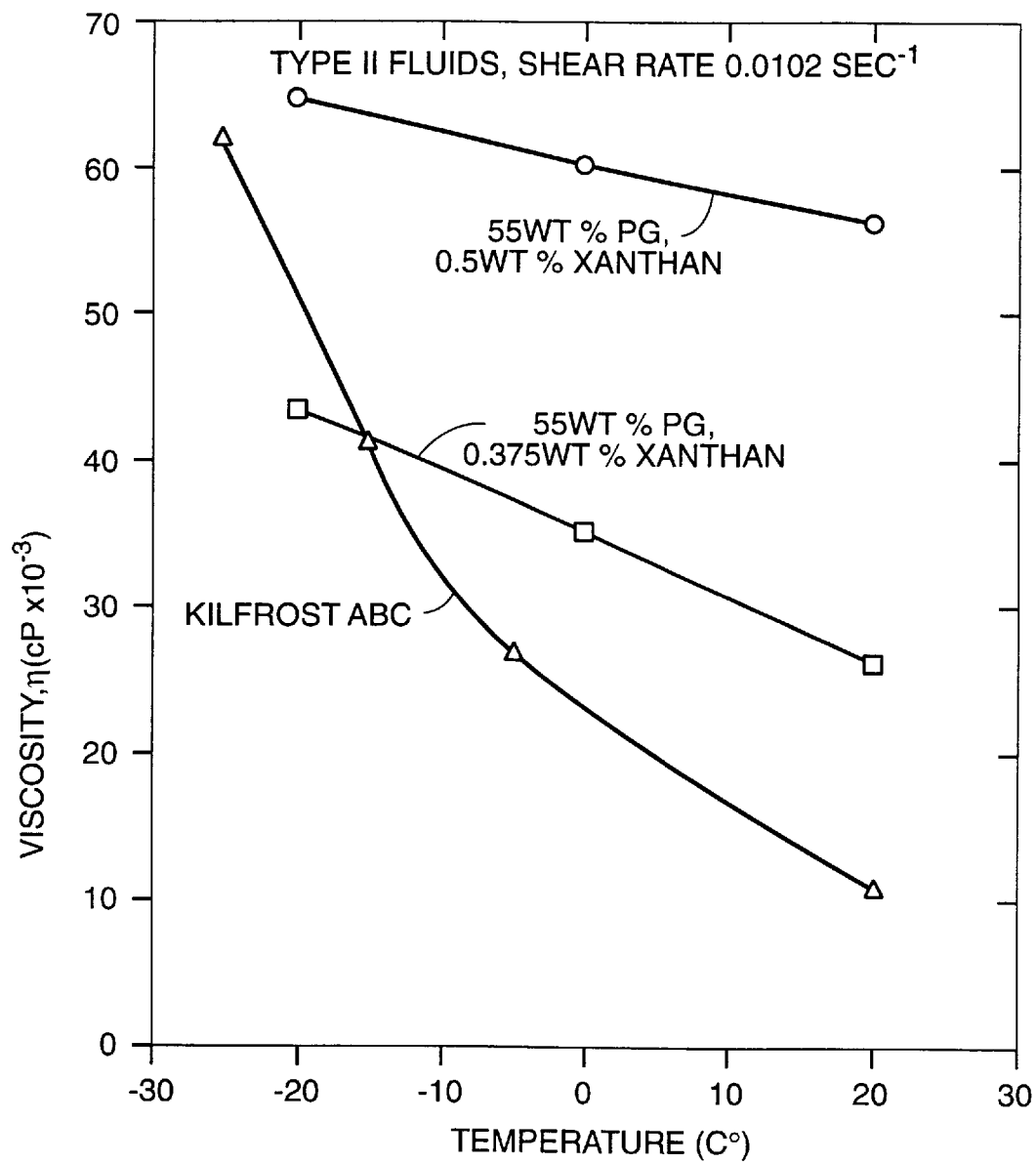
FIG._15

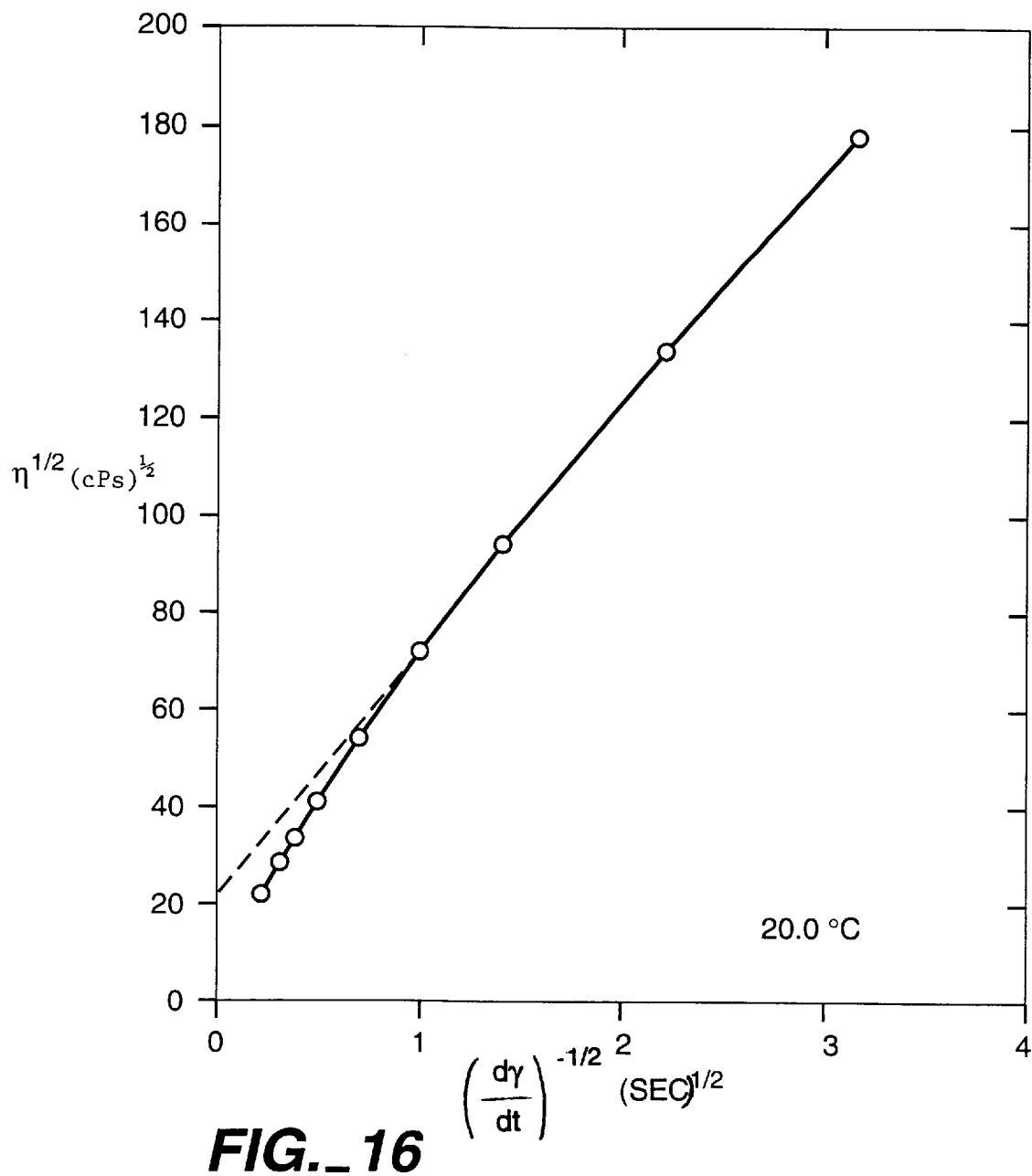
FIG._16

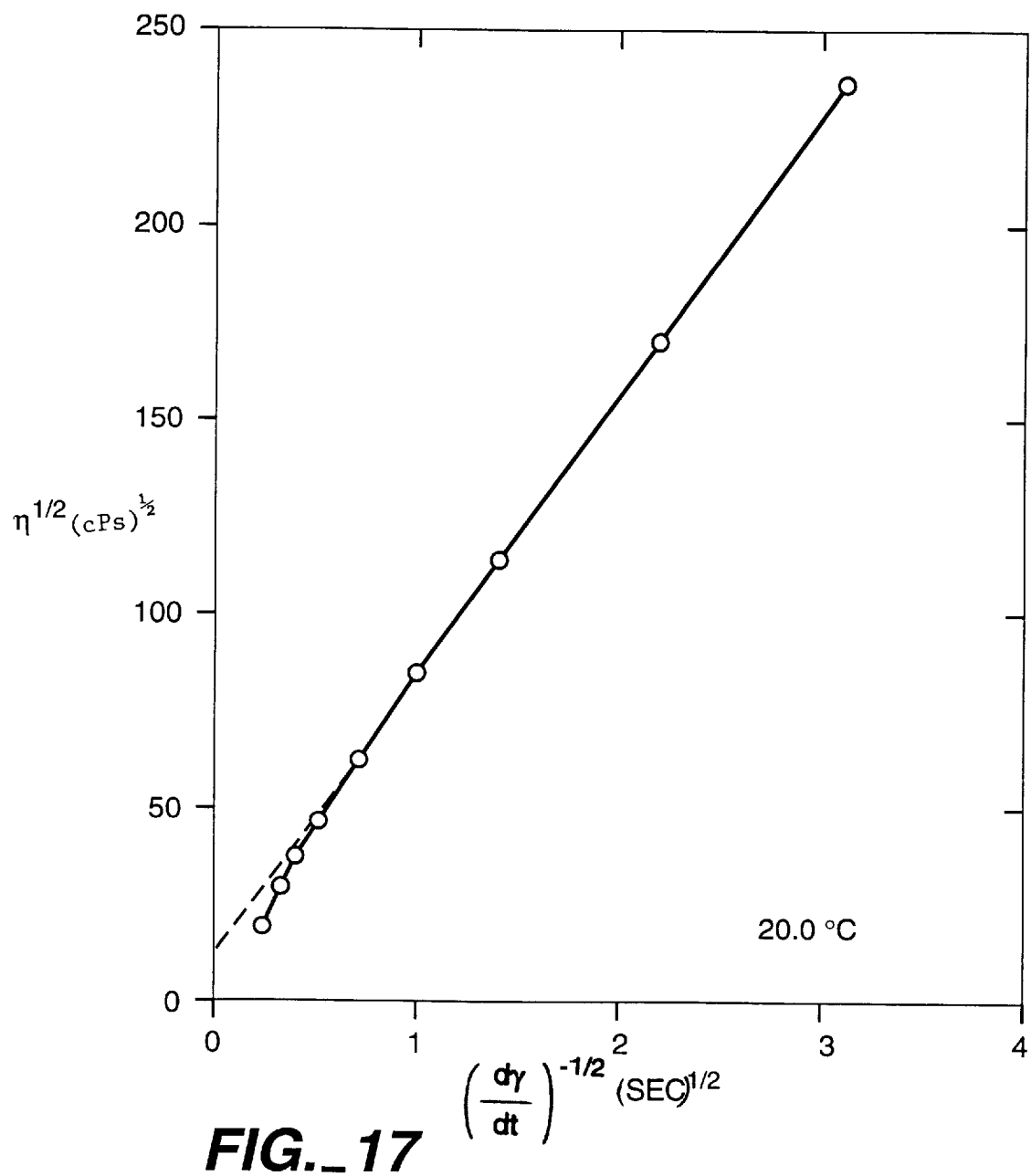
FIG._17

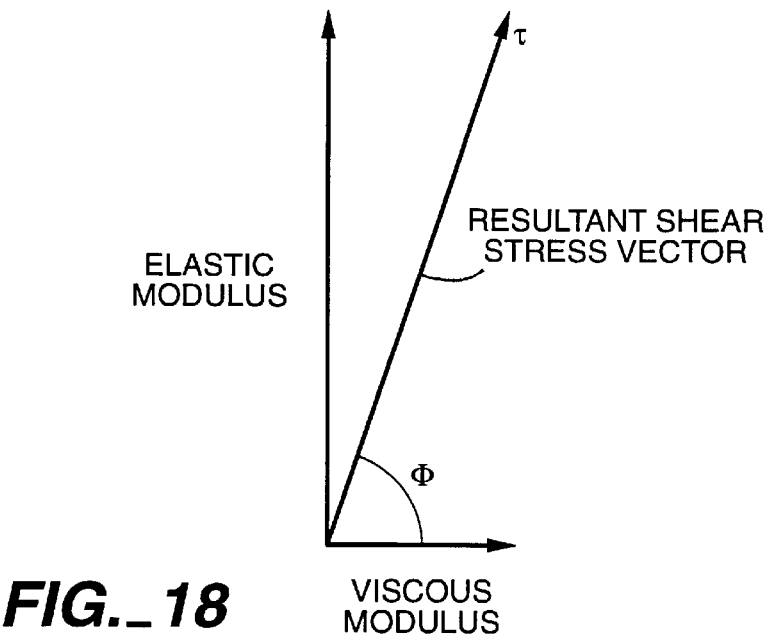
FIG._18
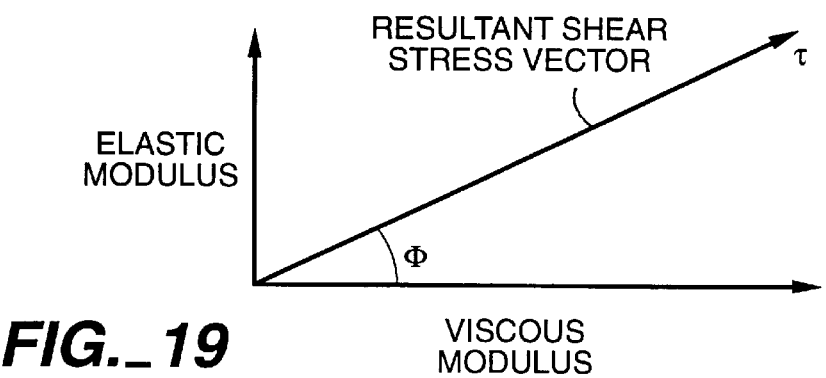
FIG._19
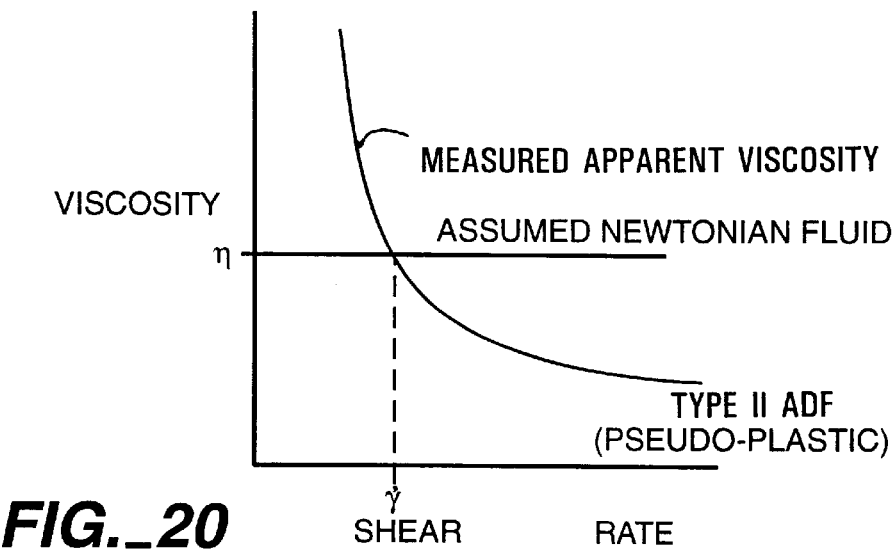
FIG._20

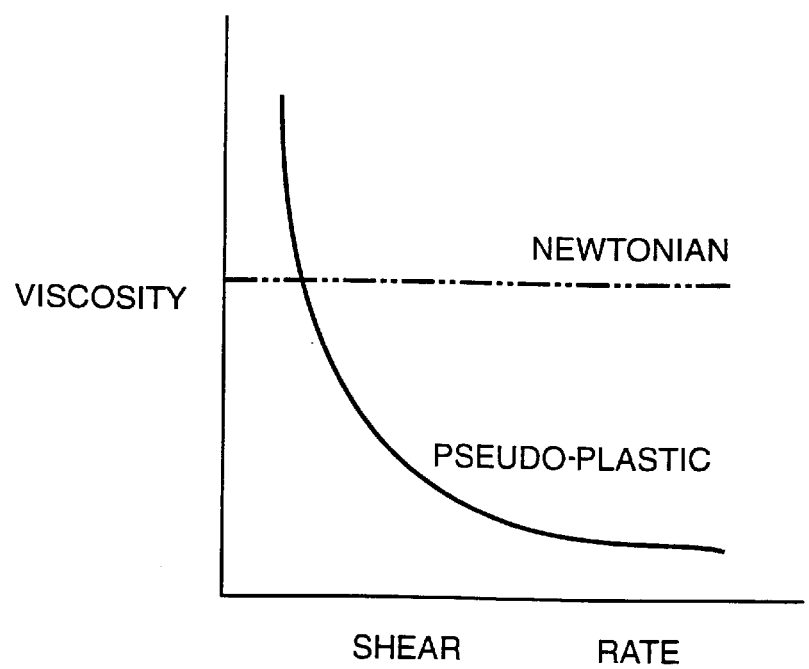
FIG._21A
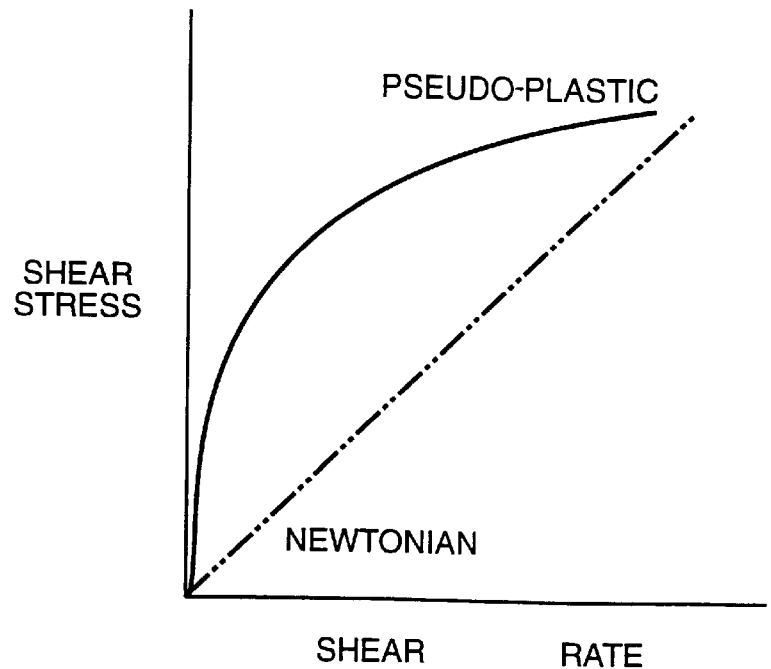
FIG._21B

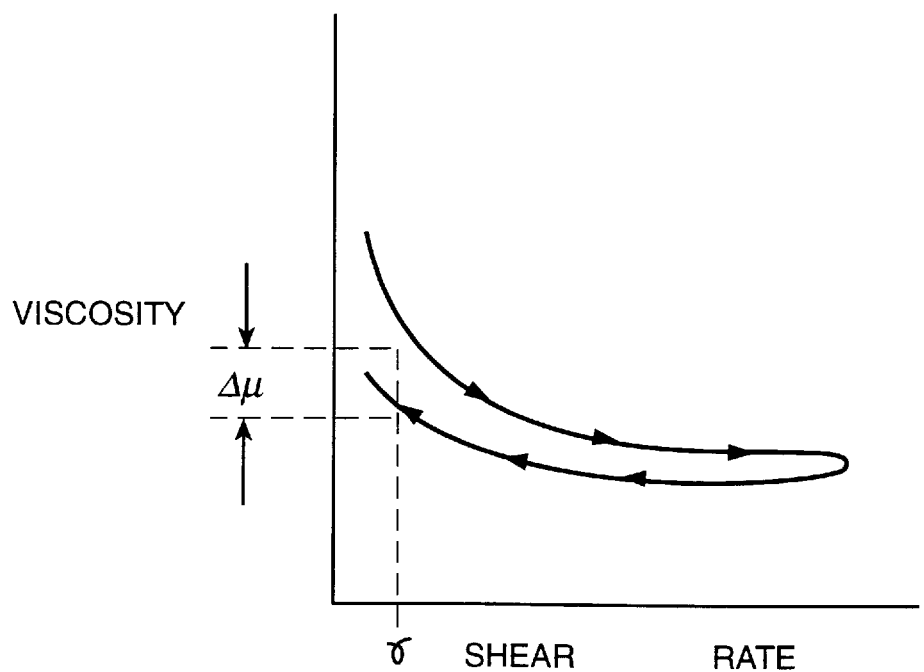
*FIG._22A*
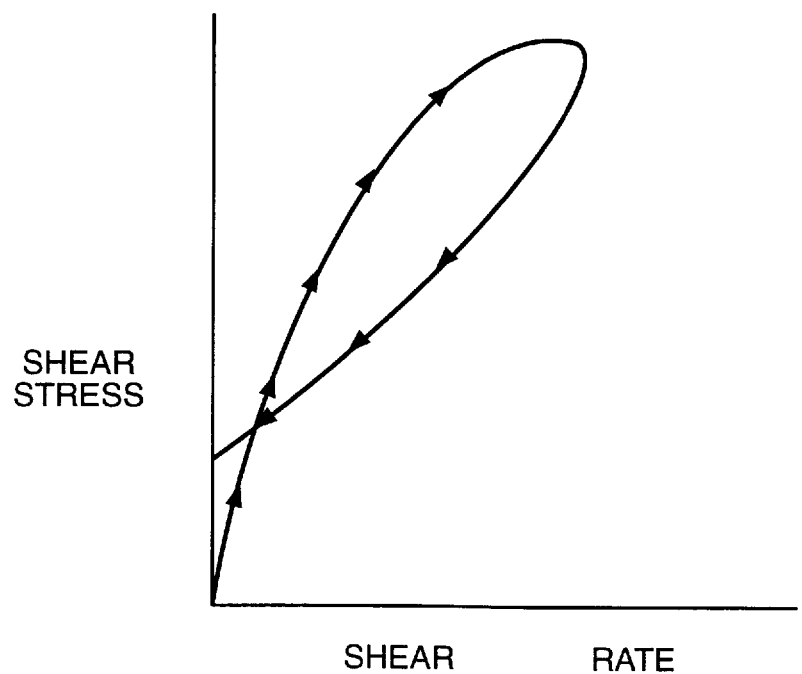
*FIG._22B*

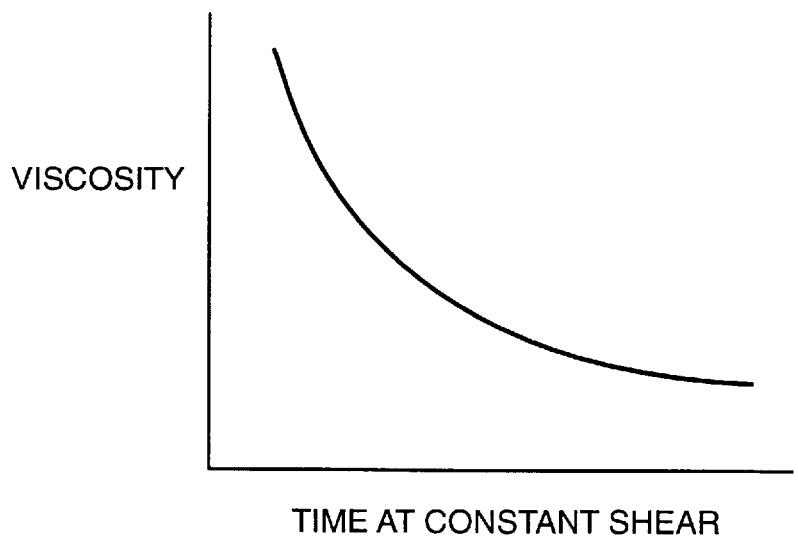
FIG._23
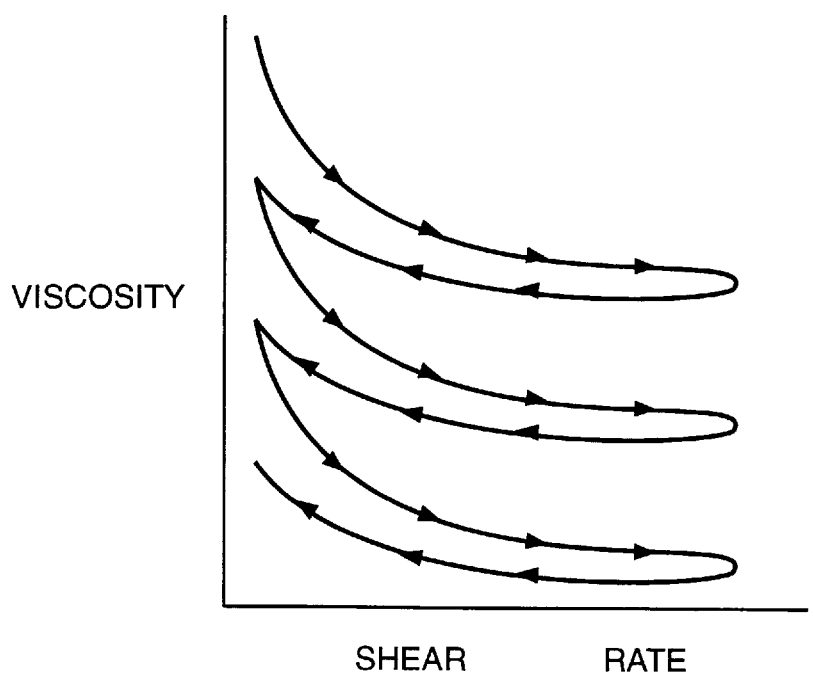
FIG._24

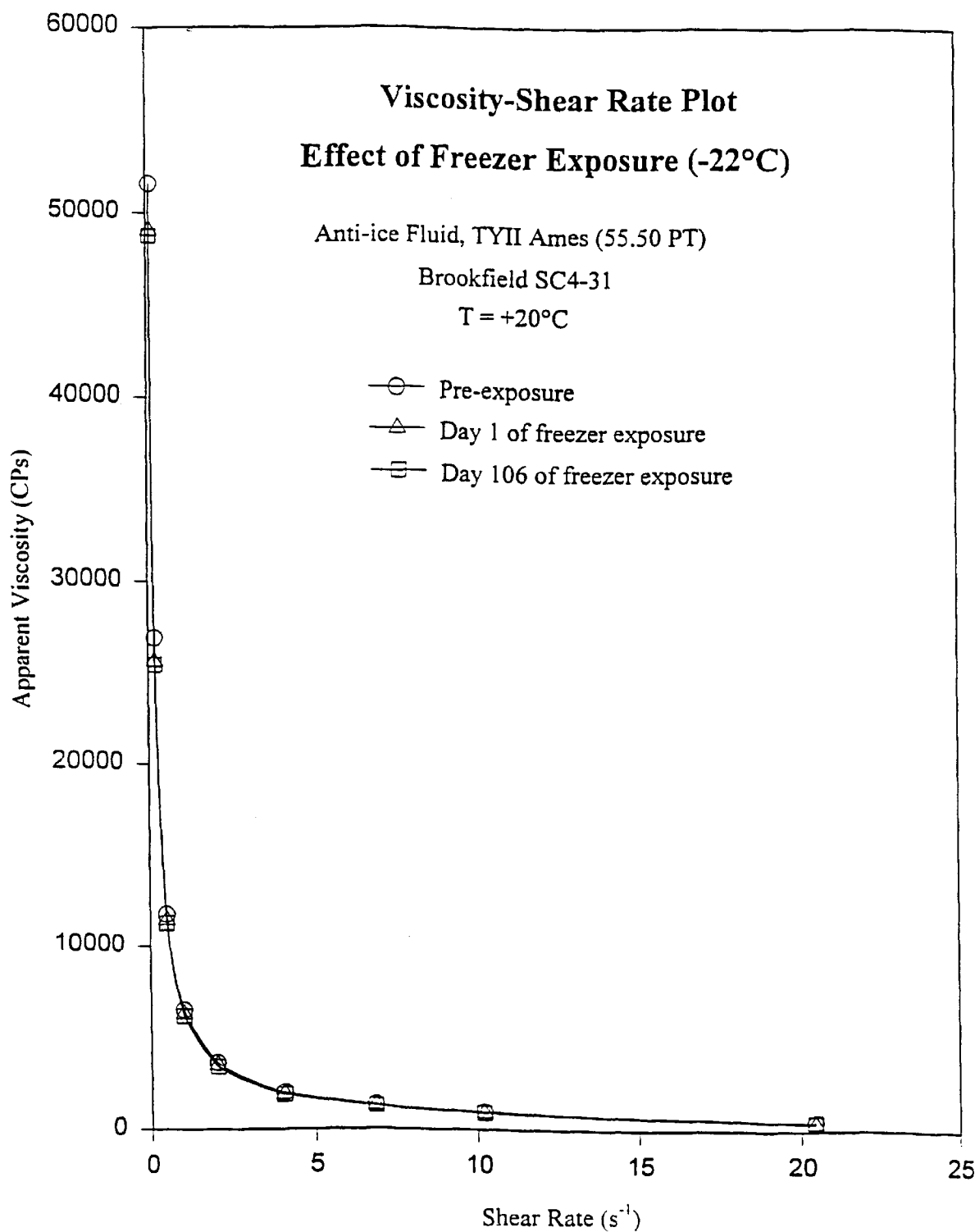
FIG._25

ENVIRONMENTALLY FRIENDLY ANTI-ICING

RELATED APPLICATIONS

This application is a continuation-in-part of U.S. patent application Ser. No. 08/380,913, filed Jan. 25, 1995, now abandoned, which is incorporated herein by reference.

BACKGROUND OF THE INVENTION

Origin of the Invention

The invention described herein was made by employees of the United States Government and may be manufactured and used by or for the Government for governmental purposes without payment of any royalties thereon or therefor.

Governmental funding in support of the research and development leading to this invention was also provided by the U.S. Air Force (WDL), Dayton, Ohio.

FIELD OF THE INVENTION

The present provides a non-toxic anti-icing or deicing fluid for use on surfaces. This invention typically relates to an aqueous, non-electrolytic, essentially non-toxic, easily biodegradable, benign, continuous single phase, environmentally-friendly, anti-icing and/or deicing fluid (or composition) for use in the removal of ice and/or for protection against further icing-up by acting as a barrier to the formation of or the adhesion of ice by liquid coating on substrate surfaces. The fluid typically has a composition of water, non-toxic freezing point depressant(s), at least one non-toxic thickener, e.g. a sugar, and optional essentially non-toxic additives, such as corrosion inhibitors, and optional other surface modifiers. A monohydric aliphatic alcohol is optionally present as a surface modifier as a means for forming a hydrophobic thin layer on the surface of the fluid structure. Preferably the alcohol is 1-dodecanol, which unexpectedly performs its intended functions when present in small amounts.

More specifically, the sugar is a polysaccharide, preferably a xanthan. Surprisingly, the composition of water, freezing point depressant, and sugar, e.g., a xanthan, when placed on the surface of an object has unexpectedly high static viscosity (higher than that of the prior art), a pseudo-plastic viscosity-shear response, and also rapid recovery of high static viscosity for improved durability. The high static viscosity, achieved by a small amount of incorporated xanthan is thus an unexpected result, and produces a fluid protective barrier to ice accretion that is very durable and long lasting for anti-icing or deicing. The rapid viscosity drop induced by increase in shear rate is a desirable feature that enables ease of fluid application and uniformity of distribution. The fluid is typically non-toxic and is biodegradable under normal atmospheric temperature, soil, and aquatic conditions.

DESCRIPTION OF THE PROBLEM AND RELATED ART

The present invention addresses major problems caused by snow, sleet, ice, frost and the like as they exist or as they form on the surfaces of objects. For purposes of this application, and unless indicated otherwise, when reference is made to ice it is to be understood that the term encompasses all forms of frozen water by whatever names they are known. The following icing problems in the art are presented.

Streets, etc.—For streets, roads, bridges, sidewalks, entrances and the like, the accumulation of snow and ice is a nuisance, causes serious loss of traction, or generates major problems. Currently, the removal is accomplished by shoveling, scraping and/or the use of salts or liquids which depress the freezing point. These salts alone are responsible for major and costly corrosion and degradation problems to metals, concrete or asphalt used in bridges, streets and sidewalks. Present liquid freezing point depressant blends may be toxic, corrosive or not rapidly biodegradable, and thus cause problems in the environment, such as those fluids which are ethylene glycol based.

Automobiles—For automobiles, trucks, i.e. all motor vehicles etc., the accumulation of ice, snow, sleet, etc. on the windshield causes severe visibility problems and is usually removed by physical scraping, use of warm liquids or liquids based on methyl alcohol (toxic) and/or ethylene glycol (toxic), or defrosting (which requires time to be effective). Also, most automotive windshield icing products only deice (correct temporarily the problem), but not anti-ice as well (prevent the visibility loss problem). Because of the high amount of salts used on the streets to remove ice, the corrosion problem to metal surfaces and particularly to automobiles is enormous. These problems require extensive undercoating, frequent washing, and eventually, in some cases, complete replacement of the automobile.

Nautical—Nautical vessels are endangered from ice formed in two different ways. Under sub-freezing temperatures with rough seas and/or windy conditions, the water spray freezes on the vessel surfaces increasing the weight of the vessel.

A second more serious threat is "ice fog". This condition is serious at sea, since it is unpredictable. When a vessel encounters "ice fog", the entire vessel is rapidly coated with ice. Vessels have capsized and been lost because of the weight of the ice. The vessel is no longer buoyant, or topples over due to ice build-up above the vessel's metacenter. This situation is also a hazard when a maneuver such as a turn is performed or the state of the sea is such that the vessel is listing. Recently, 38 commercial fishing vessels were lost off the coast of Alaska when they suddenly encountered "ice fog" conditions. Currently, the removal practice is to chip the ice off with baseball bats and mallets. Complications occur due to the freezing of passage-way doors and the slipperiness on the walkway surfaces. The ice breaking is strenuous and fatiguing, and exposes the ice breaking crew to extreme danger of being swept overboard. A practical and effective means of shipboard ice protection has been long sought. Further, the same ice hazard places naval craft at risk. Ice protection fluids, such as those commonly referred to in the art as Type II compositions, are suitable for application to all naval vessels, including their weather decks and even carrier flight decks.

Aircraft—Icing weather conditions produce especially acute problems to aircraft that are temporarily parked on the ground between flights where they can accumulate a variety of frozen precipitation, such as snow, sleet, hail, frost, hoar frost, slush and particularly ice. These accreted deposits, which form more readily on flat horizontal surfaces such as wings and empennage, can have serious consequences, for example, the aerodynamic performance characteristics of airfoils (e.g. lift and drag) may be degraded by even small accumulations of frozen water, making removal prior to flight important.

Aircraft icing prior to takeoff is a significant problem. According to the National Transportation Safety Board (NTSB), icing has been identified as the cause of 127 fatal accidents in which 496 lives were lost between 1977 and March 1992. Federal Aviation Administration (FAA) regulations require that all ice and snow accumulated under freezing conditions be removed from the aircraft prior to takeoff. To accomplish this removal, aircraft operated during cold weather (icing) conditions are sprayed with fluids to remove ice (deicing) or to prevent ice and snow accretions (anti-icing) as a safety precaution. The aviation regulatory agencies (e.g. FAA) use standards and procedures developed by the Society of Automotive Engineers (S.A.E.) or the Association of European Airline (A.E.A.) (as shown, for example, in Table IA and IB below). The SAE specifications are similar to the AEA and are used by the FAA as the guideline in the USA. The disposal of the fluids is governed by the Environmental Protection Agency (E.P.A.) and various state environmental agencies.

Table 1A shows the Association of European Airlines (AEA) guide for suggested icing treatment procedures for various ambient air temperatures at the airport.

Table 1B shows the AEA suggested guidelines, correlating holdover times after application of Type II certified fluids with current local weather conditions. Type II anti-icing fluids are applied at ambient temperatures.

The fluid concentration ratios shown in Tables 1A and 1B are volume ratios.

TABLE 1A

Suggested AEA Type II Fluid Application

| Ambient Temp. °F. | Deicing/Anti-Icing Procedures | | |
|---|---|---|---|
| | Concentration Anti-Icing Fluid/Water | | |
| | One-Step | Two-Step | |
| | Deicing Fluid 90–95° C. | Deicing Fluid 90–95° C. | Anti-Icing* Fluid Ambient |
| +32° | 50/50 Includes anti-icing in regard to weather conditions | 0/100 + Anti-Icing | 50/50 or 75/25 or 100/0 In regard to weather conditions |
| +19° | 75/25 Includes anti-icing in regard to weather conditions | 50/50 + Anti-Icing | 75/25 or 100/0 In regard to weather conditions |
| +7° | | | |
| +1° | | 75/25 + Anti-Icing | 100/0 |
| −13° | | | |

*The anti-icing atep ahould be applied within three minutes of the start of the deicing step.

TABLE 1B

| | Guidelines to Holdover Times | | | | | | | |
|---|---|---|---|---|---|---|---|---|
| | Weather Conditions | | | | | Holdover Times (Hours) | | |
| Ambient Temp. °F. | Frost | Freezing fog | Steady snow | Freezing rain | Rain on cold soaked wing | AEA Type II Fluids | | |
| | | | | | | 100/0 | 75/25 | 50/50 |
| +32° and above | | | | | | 12 | 6 | 4 |
| | | | | | | 3 | 2 | 1 1/2 |
| | | | | | | 1 | 3/4 | 1/2 |
| | | | | | | 20 min. | 10 min. | 5 min. |
| +32° to +19° | | | | | | 8 | 5 | 3 |
| | | | | | | 1 1/2 | 1 | 3/4 |
| | | | | | | 3/4 | 1/2 | 15 min. |
| | | | | | | 20 min. | 10 min. | 3 min. |
| +18° to +7° | | | | | | 8 | 5 | |
| | | | | | | 1 1/2 | 1 | |
| | | | | | | 3/4 | 1/2 | |
| +6° to −13° | | | | | | 8 | | |
| | | | | | | 1 1/2 | | |
| | | | | | | 3/4 | | |

CAUTION: The time of protection will be shortened in heavy weather conditions. Jet blast may cause a partial blow-off of the protective film. If these conditions occur, the time of protection can be shortened considerably. Improper application procedures can also affect the time of protection.

Currently, there are two types of anti-icing and/or deicing fluid compositions in use for aircraft (Type I and Type II), which reflect two fundamental approaches to assure safe aircraft takeoff under icing conditions. The first approach is to spray the surfaces of a plane with "hot" (90°–95° C.) freezing point depressant (FPD) fluids (Type I) which melt ice and snow. That sprayed aircraft must then takeoff quickly before there is any further ice buildup as per guidelines dependent on meteorological conditions.

The second approach is to remove all ice and snow with a hot spray and then quickly spray a modified (thickened)

FPD fluid (Type II) onto the aircraft surface that becomes a "thickened gel" which, acting as a protective blanket, provides a significantly longer time period of protection between the deicing step and aircraft's actual takeoff. The two fluids that match these different approaches are termed Type I (unthickened) and Type II (thickened) fluids, respectively, in accordance with the Association of European Airlines (A.E.A.) standards.

The properties of Type I and Type II fluids represent different compositions of the same family of FPD chemicals. Type II compounds usually contain thickening additives which cause the fluid to "cling" to the aircraft under various weather and pre-takeoff and taxi conditions, and then be shed automatically at a critical velocity close to (and lower than) the aircraft takeoff speed. This desirable shedding is achieved by the thickener's unusual property of having a very high viscosity until the takeoff's airflow shear rate dramatically lowers the viscosity to the point of where the fluid flows off rapidly as illustrated, for example, in FIGS. 1A to 1F.

As shown in FIGS. 1A to 1F, the viscosity-shear rate effect can be translated directly to viscosity-airspeed effect, which is a more practical correlation for aeronautical uses. When the Type II fluid's rheological properties have been correctly matched to the particular aircraft's takeoff performance, there are no appreciable amounts of anti-icing or deicing fluid remaining on the critical surfaces of the aircraft just prior to lift off and during climb acceleration.

The known Type I (unthickened) fluids are described as having a rheological flow behavior known as Newtonian flow, that is, the fluid shows a constant slope straight line relationship between shear stress and shear rate. If shown on a plot, the straight line passes through the origin. Further, at a constant temperature, viscosity also remains constant as the shear rate is varied, (see e.g., textbook FIG. 2), and Type I fluids typically have low viscosity compared to thickened fluids.

On the other hand, Type II (thickened) fluids exhibit non-Newtonian flow characteristics, which are broadly defined as one for which the relationship of shear rate and shear stress is not constant. Thus, as shear rate is varied, the shear stress doesn't vary proportionately (refer, for example, to textbook FIG. 3). For the Type II fluid to perform as an ice barrier "blanket" protector, it must have very high static and near or quasi-static viscosity while there is little aerodynamic shear. Yet the fluid must also display a rapid viscosity decrease with increasing shear rate (as during the takeoff roll) to insure the removal of Type II fluids prior to flight. More specifically, this non-Newtonian behavior of "shear thinning" is referred to as "pseudoplasticity". For delineation of the relationships among these flow behavior types, an example of a rheogram plot set is given in textbook FIG. 4 for reference. Noting that the classic Newtonian flow is the only linear behavior line passing through the origin, all others are thus described as non-Newtonian flow.

The currently used toxic deicing fluids of the art are based on glycols, primarily ethylene glycol, diethylene glycol, and propylene glycol. Significant evidence exists that these fluid formulations have detrimental affects on the environment (for example, see "Biodegradation & Toxicity of Glycols," ARCO Chemical Company, Newton Square, Pa. 19073, May 1990; and "Toxicity of Aircraft De-Icers and Anti-Icer Solutions to Aquatic Organisms," S. I. Hartwell et al, Chesapeake Bay Research and Monitoring Division, Maryland Dept. of Natural Resources, Annapolis, Md. 21401, May 1993, CBRM-TX-93-1). Ethylene glycol and diethylene glycol are in themselves toxic, while propylene glycol generally is not. However, when combined with the various conventional additives used to make the commercial ice protection fluids, the toxicity of these fluids of the art is enhanced. In addition, Type II fluids which have improved aerodynamic performance, include compounds that are generally non-biodegradable. All of the currently used glycol deicing fluids fail to meet the U.S. Clean Water Act of 1987 environmental and safety requirements. The Environmental Protection Agency is imposing clean water rules which are stringent, and consequently costly, constraints on discharge at airports of these glycol-based fluids into storm water drains and ground water supplies.

For example, the Albany County, New York airport deicing fluid run-off contaminated the local drinking water supply and required the construction of a complex catch basin/sewage treatment system which cost over $12,000,000. This new treatment system is still not considered to be fully satisfactory. New airports, such as Denver International at Denver, Colo. must have a complete collection system that is expensive, complex, and of limited efficiency. Many states, for example, are calling for zero discharge limits to the environment regarding aircraft deicing fluid run-off. The required special deicing procedure and site locations tend to adversely impact departures during peak traffic and icing/storm activities. The reclamation and disposal of the expended glycol-type fluids at Denver, for example, will have a significant cost. The economic burden for this disposal service is very high, and currently is almost cost prohibitive.

In addition, the U.S. Air Force has recently issued an order (Brig. Gen. J. E. McCarthy, USAF HQ, CE, 31 Mar. 1992) banning future purchase of ethylene glycol-based deicing fluids, and also ordered that research on replacement deicing fluids commence immediately. Thus, there is an urgent need to develop cost competitive alternative anti-icers or deicers which are non-toxic and readily biodegradable.

The following patents are presented to describe approaches and partial solutions to the problems of deicing and anti-icing:

F. A. Kormamm, in U.S. Pat. No. 2,101,472, teaches a gel containing gelatin to which is added as an antifreeze substance such as glycerol and/or a glycol.

H. L. West et al. in U.S. Pat. No. 2,373,727, teach a composition such as described by Kormamm, but also including a hydrocarbon, disclose a method and a composition for the prevention of the formation or accretion of ice on an exposed surface. The composition is for application to surfaces exposed to the deposition of ice to prevent the formation or accretion of ice. It comprises a jelly base composed of from about 7 to 17 percent by weight of a gelatinous material and from about 83 to 93 percent by weight of an antifreeze material of the class consisting of glycol, glycerol, polyglycols, polyglycerols and their mixtures, having incorporated therein from about 5 to 20 percent by weight of an organic liquid, which is immiscible with ice and water and which remains liquid at temperatures below plus 10° F.

R. H. Shapiro, in U.S. Pat. No. 2,454,886, discloses a method for the prevention of mist and frost on glass and similar sheet material.

J. M. Fain et al., in U.S. Pat. No. 2,716,067, discloses a composition of ethylene diamine and potassium thiocyanate, and optionally at least one of aqueous morpholine, potassium acetate or monomethyl amine.

J. M. Fain et al., in U.S. Pat. No. 2,716,068, discloses a composition of a glycol, and potassium thiocyanate, and optionally sodium nitrite.

S. Dawtrey et al., in U.S. Pat. No. 3,350,314, teaches a foamable composition of water, an alkylene polyol, and a long chain aliphatic tertiary amine.

H. E. F. Ordeit et al., in U.S. Pat. No. 3,362,910, disclose an automotive radiator-engine antifreeze composition.

H. R. Schuppner, in U.S. Pat. No. 3,557,016, disclose to a useful combination achieved by adding some xanthan to locust bean gum.

H. F. Scott, Jr. et al., in U.S. Pat. Nos. 3,624,243 and 3,630,913, disclose chemical deicers containing corrosion inhibitors making them specially suited for use on airport runways.

I. König-Lumer et al. in U.S. Pat. No. 4,358,389, disclose a method and a liquid composition for deicing and protecting against icing-up. In particular, the composition operates to free the metal surface of aircraft rapidly and completely from ice, hoar-frost, snow and the like, and to protect the surface against further build-up for a relatively long period. This composition includes (a) glycols, usually toxic ethylene glycol, (b) water, (c) 0.05 to 1.5 percent by wieght of a particular crosslinked polyacrylate, (d) 0.05 to 1 percent by weight of a mixed-base mineral oil which is insoluble in water, (e) surface-active agents, (f) corrosion inhibitors, and (g) alkaline compounds. These components are present in very specific quantities in each case, the quantity of the components (a) and (b) is at least 94%, relative to the total weight of the agent. There is mentioned without further support of an additional ancillary co-thickener component. Xanthan is suggested only as a possible synergistic viscosity enhancer to the claimed thickener, and xanthan is always in the presence of one or more of the other thickeners. It is never used as a single thickener alone. In the working examples the thickeners are always at 1 percent by weight of the total in addition to any xanthan present. Many other specific components are usually present. The pH value of the composition is 7.5 to 10.

Ma, et al., in U.S. Pat. No. 4,954,279, describe the König-Lumer teaching, in part, at column 3, line 6, et sec., "In addition to the components . . . , the agent . . . can also contain appropriate additives, preferably anti-oxidants and polysaccharides (gums) in effective quantities (gums and additional thickeners) . . . . It has been found that polysaccharides have an advantageous effect on the rheological properties of crosslinked polyacrylates, particularly those having viscosity values in the lower range of the viscosity limits indicated above; that is, within the range from about 1000 to 5000 cPs. Preferred polysaccharides are those of the type of high molecular xanthan gum"

K. H. Nimereck, et al., in U.S. Pat. No. 4,439,337, disclose a method and a composition for preventing freezing together of surfaces. Any surface which is to be contacted with another surface, e.g., a particulate material, in the presence of moisture (water) which is subject to freezing, is coated with a composition containing water and substantially water soluble components. The composition includes (1) a polyhydroxy compound or monoalkyl ether thereof, (2) an organic non-volatile compound having at least one hydrophilic group, (2) being different than (1), and optionally a salt which functions to increase the viscosity and tackiness of the composition sufficient to retain the composition on non-horizontal surfaces to freeze proof the same.

C. F. Parks, et al., in U.S. Pat. No. 4,501,775, disclose a method and composition to reduce the strength of ice. The composition comprises (A) a water-soluble polyhydroxy compound or monoalkylether thereof and (B) a water-soluble organic nonvolatile compound having a hydrophilic group such as amine, carboxyl or carboxylate groups in an amount to provide an effective amount, e.g., on the order of about 0.25 to 5 weight percent, of (A) plus (B) based on the weight of water. This method is especially useful for application to particulate solids, such as coal and mineral ores, which are shipped and stored in masses exposed to freezing temperatures. Any ice that is formed is physically weak and will not deter the unloading of the conditioned particulate solids.

S. H. Bloom, in U.S. Pat. No. 4,585,571, discloses a method and a liquid deicing composition. This patent provides for a deicing composition for use on airplanes, runways, streets, and the like. The deicing composition includes (a) an alkylene polyol, (b) an anionic surfactant capable of forming a hydrophobic monolayer on the metal surfaces of the aircraft, (c) a hydrophilic wetting agent which is capable of associating with the hydrophobic monolayer, and (d) a coupling agent, which facilitates the association between the wetting agent and monolayer.

A. Lieber, et al., in U.S. Pat. No. 4,606,835, disclose a salt composition having smaller sized sodium metasilicate. A dry and free-flowing composition is claimed containing (1) salt, (2) $C_2$ to $C_6$ monohydric and/or (3) polyhydric alcohol, (4) diatomaceous earth (or suitable substitute), and (5) sodium metasilicate characterized by a particle size smaller than about 80 mesh. The composition is useful for facilitating the melting and removal of snow and ice.

E. E. McEntire, et al., in U.S. Pat. No. 4,606,837, disclose coolant compositions. The water soluble thickeners are made by alkoxylating monohydric alcohol hydrophobes. The monohydric alcohol has at least 18 carbon atoms to be properly hydrophobic. In addition, a large proportion of ethylene oxide is added, such that the molar ratio of ethylene oxide to monohydric alcohol hydrophobe is at least 40:1. Improved results are obtained when 8–15 moles of propylene oxide are added first as a block to the single mole of hydrophobe. The alkoxylations are necessary to provide the desired viscosities and hydrophilic nature. These thickeners are particularly useful in the glycol-water based fluids.

A. B. Ganncy, in U.S. Pat. No. 4,606,836, discloses a calcium magnesium acetate deicer of a particular pellet size.

R. J. Tye, et al., in U.S. Pat. No. 4,698,172, disclose an aircraft anti-icing fluid. The anti-icing fluid is suitable for ground treatment of aircraft. The anti-icing fluid is a glycol-based solution containing a gel-forming carrageenan, in an amount of less than 5 wt %. The carrageenan is present in the glycol-based solution in an amount sufficient to thicken the fluid to promote its adherence to aircraft surfaces when applied to a stationary aircraft. The use of this thickened deicing fluid does not adversely affect airfoil lift characteristics during takeoff, because the fluid exhibits shear thinning and readily flows off the aircraft surfaces when exposed to wind shear during the aircraft's takeoff run.

D. A. Coffey et al. in U.S. Pat. No. 5,389,276 disclose an ethylene glycol based deicing/anti-icing composition which contains a thickener comprising a polyacrylic acid.

R. D. Jenkins et al. in U.S. Pat. No. 5,461,100 disclose an anti-icing fluid suitable for ground treatment of aircraft being a glycol-based solution containing a macromolecular polymer thickener.

All patents, articles, references, applications, standards and the like cited in this application are incorporated herein by reference in their entirety.

From the above description, it is apparent that a need exists for environmentally benign (non-toxic and easily biodegradable) compositions of anti-icing fluids and/or deicing fluid compositions that also are intrinsically superior in protection of objects from ice than known compositions.

SUMMARY OF THE INVENTION

The present invention provides a non-toxic anti-icing fluid or a deicing fluid of water, freezing point depressant and thickener, wherein the fluid is a single phase.

The present invention provides an anti-icing or deicing composition, which composition comprises:

(a) water;

(b) at least one non-toxic, water soluble, freezing point depressant selected from the group consisting of monohydric alcohols having from 2 to 6 carbon atoms, polyhydric alcohols having from 3 to 12 carbon atoms, monomethyl or monoethyl ethers of polyhydric alcohols having from 3 to 12 carbon atoms, or mixtures thereof;

(c) a non-toxic thickener, which when combined with (a) and (b) provides a continuous liquid, wherein the liquid is a homogeneous, continuous single phase, and the liquid when formed has a high near-static initial viscosity when measured using a viscosity measuring device under specified conditions, and the formed liquid after being subjected to at least one external dynamic strain rate of at least 0.5 sec$^{-1}$ for at least 1.0 min., has a second, lower viscosity as measured using the viscosity measuring device under specified conditions, and upon removal of the external dynamic strain rate, within 5 min., said liquid has a third viscosity of within about 99.5% of the initial viscosity when the third viscosity is measured on the viscosity measuring device at the specified conditions.

In another embodiment, in the composition:

in component (a) the water is present in between about 40 and 86 percent by weight of the combined water and freezing point depressant weights;

in component (b) the freezing point depressant is present in between about 14 and 60 percent by weight of the combined water and freezing point depressant weights; and in component (c) the thickener is present in between about 0.01 and 10 perent by weight of the total composition, and the sum of components (a), (b) and (c) are about 90% or higher by weight or greater of the total composition, wherein the specified conditions are between about −20° and +20° C., and preferably wherein the specified conditions are about 20° C. and 760 torr.

The present invention concerns an aqueous, non-electrolytic, essentially nontoxic, easily biodegradable, environmentaly benign, continuous phase liquid composition for use as an anti-icing or a deicing agent. The composition includes water, a non-toxic freezing point depressant, a thickener, optional one or more nontoxic environmentally benign corrosion inhibitors or surfactants, optional monohydric aliphatic unbranched alcohol, and optional coloring agent, wherein the thickener produces an aqueous liquid composition having the properties of non-Newtonian pseudoplastic rheological behavior wherein the near-static viscosity exceeds 20,000 cPs at temperature ranges of between about of −30° C. and 0° C. for icing protection and said viscosity rapidly decreases with moderate increase in shear rate to asymptomatically approach a low viscosity (below 600 cps), when a film of the composition is exposed to shear rates in excess of 20 reciprocal seconds.

The present invention also relates to an aqueous, non-electrolytic, essentially non-toxic, easily biodegradable, environmentally benign, continuous single-phase composition for use as an anti-icing agent and/or a deicing agent. These agents are for use on surfaces of an object, where ice accretion and build-up is detrimental, including but not limited to airplanes, airport pavements, roadways, bridges, walkways, entrances, electrical tower structures and their components, canals, locks, vessels, nautical components, railroad switches, automobiles, and motor vehicles. The unexpected static and dynamic icing protection properties of these novel, aqueous, non-toxic and biodegradable fluid compositions are equal to those of the present art and in most cases are superior to those of the art.

The anti-icing/deicing composition comprises:

(a) water in between about 40 and 86 by weight percent (wt %) of the sum of the weights of the freezing point depressant (FPD) and water;

(b) a non-toxic freezing point depressant (FPD) selected from the group consisting of monohydric alcohols having from 2 to 6 carbon atoms, polyhydric alcohols having from 3 to 12 carbon atoms, mono methyl or ethyl ethers of polyhydric alcohols having from 3 to 12 atoms or mixtures thereof, wherein the freezing point depressant is present in between about 10 to 60 percent by weight of the sum of the weights of the freezing point depressants and water;

(c) a thickener for producing resultant pseudoplastic flow behavior, wherein the thickener preferably consists essentially of bacterium produced hydrophilic heteropolysaccharide colloid which is present in between about 0.01 and 10 percent by weight of the total composition; and (d) optionally, a non-toxic, environmentally benign corrosion inhibitor which is present in between about 0.01 and 0.1 percent by weight of the total composition wherein said composition is a non-toxic aqueous solution and is environmentally biodegradable.

The anti-icing/deicing composition can further include:

(e) a monohydric alcohol as means for forming a hydrophobic monolayer on the exterior surface of the fluid composition applied to the structure to be given ice protection, which alcohol is selected from the group consisting of alcohols having between 8 to 24 carbon atoms. Preferably, the alcohol is a primary aliphatic alcohol with minimal or no sidechains, preferably present in between a trace quantity (i.e., between about 0.01 wt %) sufficient to form hydrophobic thin layers, essentially a monolayer, on the exterior surface, and 5.0 wt % of the total composition.

The non-toxic freezing point depressant can be selected from the group consisting of ethanol, 1-propanol, 2-propanol, 1-butanol, 2-butanol, 2-methyl-1-propanol, 2-methyl-2-propanol, 1,2-propylene glycol, 1,3-propylene glycol, 1,4-butylene glycol, 1,3-butylene glycol, 2,3-butylene glycol, glycerol, and mixtures thereof. The freezing point depressant is present preferably in between about 14 and 60 percent by weight of the sum of the weights of the freezing point depressant and water; and in component (c), the thickener is a xanthan selected to impart viscosity thickening when dispersed or hydrated in the aqueous media. The xanthan is present in between about 0.01 and 10 percent by weight of the sum of the total composition.

In one embodiment of which the fluid compositions of the present invention, additional optional constituents which may be further incorporated to enhance overall performance include, for example:

(f) environmentally benign, non-toxic surfactants such as those described in the art, between about 0.001 and 0.1 percent by weight;

(g) oxygenator(s) such as a water-soluble peroxide (i.e. $H_2O_2$), which is added during application of the fluid to the surface to assist in subsequent biodegradation and is present in between about 0.1 and 5 percent by weight; or (h) optional degradation agents which are present in amounts effective to facilitate biodegradation of the fluid after its use. Such agents include, but are not limited to enzymes, microbes, bacteria, and the like. Suitable degradation agents are optionally present between about 0.001 wt % and 2.0 wt %. Optionally, these degradation agents are added just prior to fluid application or after use, to assist in biodegradation (and decomposition) of the runoff fluid composition after its use on the surface of the object; or (i) environmentally benign non-toxic (i.e., foodgrade) bacteriostat such as those described in the art, present between about 0.001 and 0.1 percent by weight.

Another embodiment of the anti-icing or deicing composition further includes a monohydric alcohol as a means for forming a hydrophobic thin layer, essentially a monolayer, on the exterior surface of the composition applied to the structure to be ice protected, which alcohol is selected from the group of monohydric alcohols having between 8 and 16 carbon atoms, preferably between 8 and 12 carbon atoms, and more preferably, 1-dodecanol. In one embodiment of the anti-icing or deicing composition, the fluid further includes 1-dodecanol which is present between about 0.01 and 5.0 percent by weight of the total composition.

The present invention also relates to anti-icing or deicing compositions for use on the surfaces of objects such as, airplanes, runways; streets, roads, bridges, sidewalks, entrances, building and tower structures, vessels, nautical components, automobiles, trees, shrubs and the like. The anti-icing/deicing composition comprises:

(a) water in between about 40 and 86 percent by weight;

(b) a non-toxic freezing point depressant selected from the group consisting of mono hydric alcohols having from 2 to 6 carbon atoms, polyhydric alcohols having from 3 to 12 carbon atoms, mono methyl or ethyl ethers of polyhydric alcohols which have from 3 to 12 atoms or mixtures thereof, wherein the freezing point depressant is present between about 14 to 60 percent by weight;

(c) a selected xanthan present in between about 0.01 and 5 percent by weight;

(d) optionally one or more non-toxic, environmentally benign corrosion inhibitors which are present in between about 0.01 and 0.1 percent by weight of the total composition; or (e) optionally an environmentally benign non-toxic (i.e., foodgrade) bacteriostat such as those described in the art, e.g. cetylpyridinium chloride, benzylpyridinium chloride between about 0.001 and 0.1 percent by weight.

In another embodiment, the anti-icing or deicing composition, further includes component (f) a monohydric alcohol as means for forming a hydrophobic thin layer, essentially a monolayer, on the exterior surface of the fluid composition as applied to the structure to be given ice protection which alcohol is selected from the group consisting of alcohols having between 10 to 20 carbon atoms.

In another embodiment, the anti-icing or deicing composition further includes component (g) an environmentally friendly non-toxic surfactant such as these described in the art, between about 0.001 and 0.1 percent by weight.

In another embodiment of the anti-icing or deicing composition, the freezing point depressant is selected from the group consisting of ethanol, 1-propanol, 2-propanol, 1,2-propylene glycol, 1,3-propylene glycol, 1,4-butylene glycol, 1,3-butylene glycol, 2,3-butylene glycol, glycerol, and mixtures thereof. The ratio of freezing point depressant is present between about 14 and 60 percent by weight of the sum of the weights of freezing point depressant and water; and in component (c), and the thickener, xanthan, is present in between about 0.01 and 10 percent by weight.

In another embodiment of the anti-icing/deicing composition, the composition further includes a monohydric alcohol as means for forming a hydrophobic monolayer on the exterior surface of the composition as applied to the structure to be ice protected, which alcohol is selected from the group of monohydric alcohols having between 10 and 14 carbon atoms, preferably 1-dodecanol.

In another embodiment of the anti-icing/deicing composition, it further includes a liquid aliphatic wax ester as an optional means for forming a hydrophobic monolayer on the exterior surface of the fluid composition as applied to the structure to be ice protected, which liquid wax comprises natural occuring esters of CIS-monounsaturated omega-9 $C_{16}$ to $C_{24}$ linear fatty acids and $C_{18}$ to $C_{26}$ linear alcohols, with an overall chain length predominantly $C_{40}$ to $C_{44}$, preferably "Jojoba" as derived from the seeds of the *Simmondsia chinensis* plant.

For some applications, it may be desirable to use the anti-icing or deicing composition on a surface, with small grit sized, preferably biodegradable, solid particles, to increase friction and/or traction on the surface (e.g. in roads or sidewalks). Typically, aircraft surfaces will not include grit.

Most preferably a composition consists essentially of water, a non-toxic freezing point depressant (described above), a xanthan and an optional monohydric aliphatic alcohol (described above) and optionally a corrosion inhibitor and optionally a bacteriostat.

In another embodiment, the present invention relates to an anti-icing or deicing composition for use on surfaces of objects where ice accretion is detrimental and when protection from ice build-up is desired which anti-icing or deicing composition comprises:

(a) water in between about 40 and 86 percent by weight of the sum of the water and freezing point depressant;

(b) a non-toxic freezing point depressant selected from the group consisting of monohydric alcohols having from 2 to 6 carbon atoms, polyhydric alcohols having from 3 to 12 carbon atoms, mono methyl or mono ethyl ethers of polyhydric alcohols having from 3 to 12 aoms or mixtures thereof, wherein the amount of freezing point depressant is between about 14 to 60 percent by weight;

(c) a thickener for producing resultant pseudoplastic flow behavior of the composition which thickener is present in between about 0.01 and 10 percent by weight;

(d) optionally a non-toxic environmentally benign corrosion inhibitor which is present in between about 0.01 and 0.1 percent by weight of the total composition, or (e) optionally an environmentally benign, non-toxic (i.e., foodgrade) bacteriostat such as those described in the art, between about 0.001 and 0.1 percent by weight.

In another embodiment, the present invention relates to an anti-icing or deicing composition wherein:

in component (b), the freezing point depressant is selected from the group consisting of ethanol, 1-propanol, 2-propanol, 1-butanol, 2-butanol, 2-methyl-1-propanol, 2-methyl-2-propanol, 1,2-propylene glycol, 1,3- propylene glycol, 1,4-butylene glycol, 1,3-butylene glycol, 2,3-butylene glycol, glycerol, and mixtures thereof;

in component (c), the thickener is xanthan selected to impart viscosity thickening when dispersed or hydrated in the aqueous media, and the xanthan is present in between about 0.01 and 5 percent by weight, and the freezing point depressant is between about 14 and 60 percent by weight; and the objects are selected from the group consisting of aircraft, airport pavements, roadways, walkways, bridges, entrances, structures, canals, locks, components, vessels, nautical components, railroad switches, automobiles and motor vehicles.

In another embodiment, the present invention relates to an anti-icing or deicing composition for use on the surfaces of objects, which anti-icing or deicing composition comprises:

(a) water in between about 40 and 86 percent by weight of the sum of the weights of the FDP(s) and water;

(b) a non-toxic freezing point depressant selected from the group consisting of mono hydric alcohols having from 2 to 6 carbon atoms, polyhydric alcohols having from 3 to 12 carbon atoms, mono methyl or mono ethyl ethers of polyhydric alcohols having from 3 to 12 atoms or mixtures thereof, wherein the amount of freezing point depressant is between about 14 to 60 percent by weight of the sum of the weights of FDP(s) and water;

(c) a thickener, xanthan, which is present in between about 0.01 and 10 percent by weight; and (d) optionally a corrosion inhibitor which is present in between about 0.01 and 0.1 percent by weight of the total composition.

In another embodiment the present invention relates to an anti-icing or deicing composition wherein:

in component (b), the freezing point depressant is selected from the group consisting of ethanol, 1-propanol, 2-propanol, 1-butanol, 2-butanol, 2-methyl-1-propranol, 2-methyl-2-propanol, 1,2-propylene glycol, 1,3-propylene glycol, 1,4-butyleneglycol, 1,3-butylene glycol, 2,3-butyleneglycol, glycerol, and mixtures thereof, and the freezing point depressant is between about 30 and 60 percent by weight of the sum of the weights of FDP(s) and water; and in component (c), the xanthan is present in between about 0.1 and 1 percent by weight; and the objects are selected from the group consisting of aircraft, airport pavements, roadways, walkways, bridges, entrances, structures, canals, locks, components, vessels, nautical components, railroad switches, and motor vehicles.

In another embodiment the present invention relates to an anti-icing or deicing or anti-icing composition for use on the surfaces of objects, which anti-icing or deicing composition consists essentially of:

(a) water in between about 40 and 60 percent by weight of the sum of the weights of FDP(s) and water;

(b) a non-toxic freezing point depressant selected from the group consisting of mono hydric alcohols having from 2 to 6 carbon atoms, polyhydric alcohols having from 3 to 12 carbon atoms, mono methyl or mono ethyl ethers of polyhydric alcohols having from 3 to 12 atoms or mixtures thereof, wherein the amount of freezing point depressant is between about 40 to 60 percent by weight of the sum of the weights of FDP(s) and water;

(c) a xanthan which is present in between about 0.01 and 10 percent by weight; and (d) optionally a corrosion inhibitor which is present in between about 0.01 and 0.1 percent by weight of the total composition.

In another embodiment the present invention relates to an anti-icing or deicing composition which further includes solid particle means for increasing friction and traction in the composition on the surface to be anti-iced or deiced, wherein said solid particles are present in between about 0.1 and 20 percent by weight of the sum of the solid particle means and the fluid composition.

In another embodiment the present invention relates to an anti-icing or deicing composition for use in motor vehicle surface applications:

in subpart (b) the non-toxic freezing point depressant is a mixture of propylene glycol present in about 5 to 15 weight percent, and isopropanol about 40 to 55 weight percent of the sum of the weights of the FPD(s) and water, and optionally further includes 1-dodecanol in between about 0.01 and 5.0 weight percent.

In another embodiment the present invention relates to an anti-icing or deicing composition for aircraft surfaces, said composition having a near-static viscosity at a shear rate of about 0.1 $\sec^{-1}$ of 25,000 to 75,000 cPs and a shear thinned viscosity at a shear rate greater than 20 $\sec^{-1}$, below 1000 cPs, at a temperature of between about 0° and −20° C.

In another embodiment the present invention relates to an anti-icing or deicing composition having a near static viscosity of between about 20,000 to 120,000 cPs at between about 0° and −20° C.

BRIEF DESCRIPTION OF THE DRAWINGS

FIGS. 1A, 1B, IC, ID, IE and 1F are each a graphic and pictoral representation of the rheological behavior of conventional Type II FPD fluids (for example, ABC-3 of KILFROST®, (a deicing fluid of KILFROST Ltd, Northumberland, UK); Octagon FORTY BELOW® (a deicing fluid composition of Octagon of Octagon, N.J.); UCAR ULTRA® (a deicing fluid of Union Carbide of Danbury, Conn.); and aircraft anti-icing embodiments of this invention) applied to a wing section in various airflow states.

FIG. 1A is a graph of viscosity versus aircraft speed at brake release.

FIG. 1D is a cross-sectional representation of the wing (11) covered on the top with Type II fluid (12) at aircraft brake release.

FIG. 1B is a graph of viscosity versus aircraft speed during takeoff roll.

FIG. 1E is a cross-sectional representation of the wing (11) partially covered on top with Type II fluid (13) during the aircraft takeoff roll.

FIG. 1C is a graph of viscosity versus aircraft speed at rotation.

FIG. 1F is a cross-sectional representation of the wing (11) having most of the Type II fluid (14) removed at the speed of aircraft takeoff.

FIG. 2 is a textbook graphic representation of the invariant or constant apparent viscosity of a typical Newtonian behaving fluid when subjected to varying shear rates, at constant temperature.

FIG. 3 is a textbook graphic representation of a non-Newtonian fluid, typical of a xanthan thickened FPD fluid representative of the compositions of this invention. It shows both the characteristic pseudoplastic flow behavior and the Ellis type flow behavior yield value.

FIG. 4 is an overall, idealized, textbook graphic representation of the germane flow behavior of generic types of non-Newtonian fluids whose viscosity properties vary with shear rates.

FIG. 5 is a graphic, textbook log—log presentation of the idealized Ellis-type, pseudoplastic flow behavior of a typical xanthan thickened FPD fluid of this invention. It highlights the near-zero shear viscosity ($\eta_o$) at and about the "yield point" and the infinite shear rate viscosity ($\eta_\infty$), with power law behavior between these points.

FIG. 6 is a graphic representation typical of the compositions of the prior art presenting the apparent viscosity in centipoise (cPs) versus shear rate ($sec^{-1}$), as taken from FIG. 1 of Tye, et al, U.S. Pat. No. 4,698,172 (original in semi-log plot), and compared in that patent with measured values for Hoechst 1704® Type II (icing protection fluid of Hoechst AGF, Frankfurt, Germany), and intended to show superior properties of that invention's thickener, carrageenan gum.

FIG. 7 is a graphic representation of the present invention's composition of water (44.5 wt %), isopropyl alcohol (55 wt %), and xanthan (0.5 wt %) showing the response of the apparent viscosity in centipoise versus the shear rate at 20° C. Note the similarity of this flow behavior to that of the composition shown in FIG. 9.

FIG. 8 is a graphic representation of apparent viscosity versus shear rate. It compares the commercially available deicing composition KILFROST® ABC 3, (deicing composition of propylene glycol with toxic and environmentally detrimental additives), with a version in accordance with this invention having an approximate composition of water (44.5 wt %), isopropyl alcohol (55 wt %), and xanthan (0.5 wt %). Note the higher near-static viscosity and rapid shear-thinning of the composition of the invention.

FIG. 9 is a graphic representation of the apparent viscosity versus shear rate for one embodiment of the present invention's composition of water (44.5 wt %), propylene glycol (55 wt %) and xanthan thickener (0.5 wt %), at –20° C., 0° C., and +20° C. Note particularly, the higher near static viscosity and rapid shear-thinning of the viscosity of a composition of the present invention.

FIG. 10 is a graphic representation of the magnified, low shear rate portion of the –20° C. shear rate of FIG. 9.

FIG. 11 is a graphic representation, of one embodiment of the present invention, of apparent viscosity and shear rate for water (44.625 wt %), propylene glycol (55 wt %) and xanthan thickener (0.375 wt %) at 0° C. and +20° C.

FIG. 12 is the magnified, low shear rate portion of the shear rate of FIG. 11, and further includes behavior at –20° C.

FIG. 13 is a graphic representation of one embodiment of the present invention showing apparent viscosity and shear rate for water (44.75 wt %), propylene glycol (55 wt %) and xanthan thickener (0.25 wt %) at 20° C.

FIG. 14 is a semi-log plot of embodiments of the present invention at 0.25, 0.375 and 0.5 wt % xanthan thickener. It demonstrates the linear relationship of the near-static viscosity of a 55 wt % FPD fluid with changes in concentration of the xanthan at 20° C.

FIG. 15 is a graphic representation of the apparent near-static viscosity (0.0102 $sec^{-1}$ shear rate) versus temperature comparing the composition having 0.50 wt % and 0.375 wt % xanthan and 55 wt % propylene glycol in water to a commercial fluid typical of the prior art composition of KILFROST® ABC (KILFROST 1990 Technical Booklet, Albion Works, Northumberland, UK).

FIG. 16 graphically presents a plot of the square root of apparent viscosity ($\eta$) plotted against the reciprocals of the square root of shear rate $\dot{y}$, as discussed in the section relating to the "smart fluid" technology, using data characteristic of an embodiment of this invention, having the composition; 52.1 wt % isopropanol, 5.2 wt % propylene glycol, 0.4 wt % xanthan, 42.3 wt % water.

FIG. 17 is a graph similar to FIG. 16, but using data characteristic of a different composition of the present invention as shown for 55.0 wt % propylene glycol, 0.5 wt % xanthan, and 44.5 wt % water.

FIG. 18 is a graphic textbook representation of the rheological moduli typical of a classically behaving elastic type liquid, showing that elastic modulus has a stronger contribution to shear stress ($\tau$) than does viscous modulus, as indicated by angle $\phi$.

FIG. 19 is a graphic textbook representation of the rheological moduli typical of a classically behaving viscous type liquid, showing, as opposed to the type of FIG. 18, that the viscous modulus is dominant, and hence a stronger factor on temperature effects.

FIG. 20 is a graphic textbook representation of the rheological behavior of a Newtonian fluid and a pseudoplastic Type II anti-ice or deicing fluid (ADF), for example, as shown in FIG. 10.

For the following figures (21 through 24), these rheology textbook graphs are typical, as for example as shown in: Foundations of Colloid Science, Vol. II, Oxford University Press, 1989.

FIG. 21A is a textbook graph which shows a characteristic curve for viscosity versus shear strain rate for a pseudoplastic and a Newtonian fluid.

FIG. 21B is a textbook graph which shows a characteristic curve for shear stress versus shear strain rate for a Newtonian and pseudoplastic fluid.

FIG. 22A is a textbook graph of a curve of viscosity versus shear rate for a thixotropic fluid.

FIG. 22B is a textbook graph of a curve of shear stress versus shear rate for a thixotropic fluid.

FIG. 23 is a textbook graph of a curve for apparent viscosity versus time at constant shear for a thixotropic fluid.

FIG. 24 is a textbook graph of a curve for viscosity versus shear strain rate for a non-recovering, thixotropic viscosity reduction through three shear cycles.

FIG. 25 is a graphic representation of the cold storage stability, characteristic of this invention's fluid composition. The viscosity versus shear rate rheological data presented in the figure represents the results of evaluating small portions, each taken from the fluid stored in a freezer (at about 22° C.) in a closed glass container. These samples were warmed slowly to room temperature (around +20° C.), also in a closed glass container, and then evaluated for shear rate dependency of viscosity using the same laboratory Brookfield viscometer that was used throughout the development work herein. A comparison was made of each sample's characteristic with the original data. No changes were observed throughout the test series, which lasted for over 106 days of cold storage viscosity tests (and continues).

The figures included here, present representative rheological characteristics of various compositions typical of some of the embodiments of the invention herein. They graphically demonstrate some improved properties of these new compositions, and in many examples, how these non-toxic compositions have properties which exceed those of the known art, e.g., KILFROST ABC-3®; HOECHST 1704®; UCAR ULTRA®; and OCTAGON FORTY BELOW®.

DETAILED DESCRIPTION OF THE INVENTION AND PREFERRED EMBODIMENTS

Definitions

As used herein:

"Alginate" refers to any of several derivatives of alginic acid (e.g., calcium, sodium or potassium salts or propylene glycol alginate). They are hydrophilic colloids (hydrocolloids) obtained from seaweed. Sodium alginate is water-soluble but reacts with calcium salts to form insoluble calcium alginate. Algenates are commonly used as food additives.

"Ambient conditions" refers to those pressure, temperature, humidity, etc. conditions of the actual environment. Typically ambient conditions are about 20° C. and 760 torr.

"Anti-icing" refers to the general term in this art. It usually describes the use of some external force, heating, shock, a liquid (gel) composition; whose function is to slow or to stop the icing process or to render any icing which might occur to be easily removed.

"Biodegradable" refers to the eventual decomposition of the fluid after use by the action of the environment, e.g. microorganisms resulting in innocuous end products.

"Carrageenan" refers to a sulfated phycocolloid. The aqueous, usually gel-forming, cell-wall polysaccharide mucilage is found in the red marine algae (*Chondrus crispus* and several other species) and from red seaweed (Rhodophyceae). It is commonly used as an emulsifier in food products, etc.

"Continuous single phase" refers to the property of a fluid such that there is no abrupt discontinuities of physical properties throughout its bulk. The present invention is essentially free of mineral oil or any other water insoluble liquid (e.g. less than about 0.25 wt. percent).

"Deicing" refers to the general term in this art, which usually describes the use of some external force (e.g. a hot liquid composition, scraping, lowering the freezing point, etc.) to remove ice already formed on a surface.

"Effective amount" refers to the amount sufficient to provide the desired properties of anti-ice or deice to meet the particular application requirements, for example, a clear automotive windshield.

"Ellis fluid" is defined as a pseudoplastic fluid with a well defined yield point or yield stress which must be overcome before flow commences, and that flow follows the pseudoplastic model. *Xanthomona campestris* thickened fluids of the present invention, being Ellis fluids in behavior, do not exhibit any thixotropic (nor rheopectic) characteristics. Therefore, they do not have time-dependent plasticity in their rheological performance. Fluids thickened with, for example, a xanthan of this invention behave as an Ellis fluid.

"Environmentally benign" means that the impact to the environment by the component or composition under normal use conditions is not harmful to plant or animal health.

"Hazardous or toxic materials" refers to those compounds so designated by the Environmental Protection Agency (EPA), 40 CFR 261.33 (1994).

"Holdover time" is the expected aircraft icing protection time of the anti-icing fluid under various weather conditions. The estimated protection time is the time interval between the beginning of the anti-icing operation and the inability of the fluid to protect water on the wing from freezing. As mentioned earlier in the discussions of Tables 1A and 1B, it is difficult to accurately predict the holdover time or the protection time for the known art compositions.

"Monolayer" refers to a single continous layer or film that is one cell or molecule in thickness.

"Neutral" when referring to the total composition means a pH of between about 6.9 and 7.1 preferably about 7.0.

"Non-electrolytic" refers to the inherent non-ionic non-conductivity property of the fluid since it contains no ionic species (i.e. salts) in the composition.

"Non-Newtonian fluids" refer to fluids which exhibit different apparent viscosity values when tested at the same temperature, and with the only parameter variant being that of rate of shear. Non-Newtonian fluids show changing viscosity with changing shear rate. There are five types of non-Newtonian fluids; three which are shear rate dependent (dilatant, pseudoplastic, and Ellis, see textbook FIGS. 21A and 21B) and two which are time dependent (rheopectic and thixotropic). One of the shear rate dependent types is pseudoplastic, in which the apparent viscosity decreases with increasing shear rate until finally leveling out at very high shear rates. Textbook FIG. 21A shows an example of the characteristic viscosity, and FIG. 21B shows an example of the shear stress versus shear rate curves for pseudoplastic non-Newtonian fluids.

One of the two, more complex, time-dependent fluid types is thixotropic, in which viscosity decreases with time under exposure to a constant shear stress such as gravity. Thixotropic fluids are complex because their visicosities are, in reality, dependent both on time and shear rate (textbook FIGS. 22A and 22B). A thixotropic fluid does not follow the same stress and viscosity curves when shear strain is applied and then removed. Further, thixotropic behavior may be either recoverable or nonrecoverable. This is, if after being subjected to the shear cycle shown in textbook FIGS. 22A and 22B, a fluid is static, some fluids will recover the viscosity reduction $\Delta\mu$ and start the next shear cycle at the original viscosity level. In addition, an undesired characteristic of thixotropic compositions, for purposes of this invention, is the time dependent plasticity or flow under an applied constant stress. FIG. 23 shows this behavior of thixotropic fluids, as responding, for example, to the constant shear force caused by gravitational effect. Other fluids however, do not recover to the original viscosity value, but instead begin each shear cycle at progressively lower viscosities as shown in the textbook FIG. 24.

To further complicate matters, the current A.E.A. type II fluids exhibit both pseudoplastic and thixotropic behavior. The pseudoplastic behavior of the fluid allows it to remain thick and cling to a stationary or taxiing aircraft, but thin out and blow off as shear forces (due to high speed wind during acceleration for takeoff) act upon it. The thixotropic property of the fluid makes it difficult to handle, because of "shear damage", wherein the original level of high viscosity is never attained again. Thus, it is apparent for purposes of aircraft ice protection, thixotropic rheological behavior is a very undesirable property for these fluids.

"Non-toxic" refers to the benign nature of the interaction of the component or composition with respect to the tolerance by specific plant or animal organisms (i.e. vegetables, animals, humans, and aquatic life), at the concentrations of normal use.

Non-toxic therefore refers to those compounds that are General Recognized As Safe (GRAS) for direct addition to human food by the Federal Drug Administration (FDA) standards, or compounds which are practically non-toxic to aquatic life as defined by the U.S. Fish and Wildlife Service, U.S. Department of Interior under the conditions for the use of the invention for anti-icing or deicing purposes. Preferably, the $LD_{50}$ of the composition (for rat) is about 1 g/kg or greater.

"Protection time" refers to the useful time provided by the deicing step. There are many variables affecting the protection time: e.g. wind velocity, precipitation rate, outside air temperature (OAT), aircraft skin temperature, solar radiation, types of precipitation or other hydrometeorological deposits (drizzle, rain, freezing drizzle, freezing rain, snow, snow pellets, snow grains, ice pellets, hail, hailstones, ice crystals, dew, frost, hoar frost, rime, glaze, and/or blowing snow), jet blast from other aircraft, sudden changes in temperature or precipitation type or rate, etc. All these can affect the holdover protection time.

"Propylene glycol" refers to 1,2-propanediol (the product of the hydrolysis of propylene oxide). The term may also include the 1,3-propanediol isomer.

"cPs" refers to centipoise, a unit(s) measure of viscosity, and is interchangeable with "mPaS", milli Pascal seconds.

"Specified conditions" refers to those conditions to perform physical property measurements, e.g. viscosity. For viscosity measurements the temperature can be between about $-20°$ and $+20°$ C. and at ambient pressure. More preferably, the temperature are each about $-20°$, $-10°$, $0°$, $+10°$, $+20°$ C.

"Static viscosity" and "near static viscosity" are terms which refer to the viscosity of the pseudoplastic fluid at the onset of flow resulting from low shear rates (i.e., 0.102 $\sec^{-1}$, or less).

"Thixotropy" refers to a non-Newtonian rheological flow behavior where viscosity depends on the shear history. The viscosity decreases with time at a constant shear rate, has an initial yield point characteristic of a solid, and behaves with time dependent plasticity with a reversible time dependent recovery. That is, the state changes from gel to sol to gel, and behaves the opposite to "rheopectic" materials.

"Viscosity" and "apparent viscosity" are, for purposes herein, used interchangeably, and without being bound by theory. They refer to all measured viscosities presented here (i.e., as measured by the Brookfield Viscometer). They are derived by the device by determining the ratio of the torque ($\tau$) to shear speed(s). Absolute viscosity ($\Delta\tau/\Delta s$) is obtained by calculating the ratio of incremental torque ($\Delta\tau$) to speed increment ($\tau s$).

"Weight percent" (wt %), refers to the weight of that constituent, per hundred ratio, with respect to total weight of the combined composition, unless otherwise specified.

"Xanthan" generally refers to variety of synthetic, water-soluble (either hot or cold) hydrophilic heteropolysaccharide colloid polymers, e.g. one made by in-vitro fermentation of carbohydrates by the bacterium *Xanthomonas campestris*. The xanthan polysaccharide colloids to be used in accordance with this invention and their preparation are described in U.S. Pat. No. 3,557,016. They are known commercially available food thickening and suspending agents that are heat-stable, with a tolerance for strongly acidic and basic solutions. The solutions have stability and compatibility with high concentrations of salts (sodium chloride 15% and calcium chloride 25%). The viscosity remains stable over wide temperature ranges ($-18°$ C. to $+80°$ C.) and over wide pH ranges (1 to 11).

In general, high molecular-weight polymeric dispersions exhibit forms as non-Newtonian flow, most often pseudoplastic to some extent, and is characteristic of aqueous solutions of polysaccharides. It is well known in literature describing the art for the use of xanthan gum, that these certain polysaccharides dissolve in water to form solutions; that is, homogeneous single phase aqueous constituents. For example, the KIRK-OTHMER, *ENCYCLOPEDIA OF CHEMICAL TECHNOLOGY*, Third Ed. Vol 12 (1980), John Wiley & Sons, N. Y., which describes on page 62 that, "Xanthan gum is a cream-colored powder that dissolves in either hot or cold water to produce solutions with high viscosity at low concentration. These solutions have unique rheological properties. They exhibit pseudoplasticity, i.e., the viscosity decreases as the shear rate increases." In aqueous solutions of xanthans, for example, I. T. Norton, et al, in 1984, "Mechanism and Dynamics of Conformational Ordering in Xanthan Polysaccharide." *Journal of Molecular Biology*, 175 (3); 371–394, suggest that this behavior is believed to result from the formation of complex molecular aggregates by means of hydrogen bonding and physical entanglements of the long polymer chains.

Xanthan aqueous solutions of the embodiment compositions of this invention display excellent viscosity versus shear rate characteristics, and have no time-dependent plasticity behavior. The fluid flow behavior, shown in FIG. 5, highlights the zero-shear viscosity ($\eta_0$) and infinite-shear viscosity ($\eta_\infty$) with power law behavior in between these two limits. Having this initial yield stress characterizes the xanthan thickened fluids of this invention as an Ellis (or non-Bingham plastic) variant of pseudoplasticity, and the Ellis curve in FIG. 4. This thickener has an initial value of infinite shear stress (known as yield stress). That initial resistance, which must be exceeded to initiate flow, can be determined for each set of conditions such as fluid temperature and thickener concentration, leading to the development of a "smart fluid" or ice protection. This fluid and its properties are described in detail in the text below.

A thickener discovered to possess the unexpectedly desirable features of the present invention is preferably xanthan, the hydrophobic polysaccharide colloid described above. Its use imparts surprisingly improved Type II fluid properties, and is compatible with essentially all FPD fluids tested (including mixed glycols). A comparison of a fluid of the present invention with a current commercially used Type II fluid KILFROST ABC-3® is shown in FIG. 8. This figure highlights the rheological performance of a composition typical of the fluid composition of this invention, and compares its dramatic viscosity decline with shear rate to that of the KILFROST ABC-3®. This behavior can be described as, "like going from lime sherbet to limeade during takeoff roll". The lime alludes to the emerald green shown in the magazine photograph (See article in *Aviation Week and Space Technology Magazine*, Jan. 11, 1993, page 44, where the emerald green hues were obtained using FD&C food colors yellow #5 and blue #1 (Any FD&C approved food color can be used).

The present invention improves on fluids of the art, and claims compositions different from any presently used, as is described hereinbelow. Further, the present invention results in a new series of compositions of such fluids that are superior to those presently known of the prior art in essentially all significant properties, including, but not limited to, rheological flow behavior; resistance to mechanical (hysteresis) damage to viscosity; shelf-life (in excess of three years); hold over times (in excess of 36 hrs); resistance to drizzle dilution; and the ability to be foamed in-situ or be varied in composition in-situ ("a smart fluid") to meet specific requirements.

The present invention is, therefore, an improved composition for protecting against icing-up on the surface of objects, i.e. anti-icing and de-icing, particularly for aircraft, which fulfills the demands mentioned initially, and particularly those relating to the important properties, namely, controlled stability against shear, controlled viscosity, rheological behavior (this is, in particular, the controlled viscosity and controlled flow behavior at a low and at a very high shear rate), holdover time, and particularly, low toxicity and facile environmental degradation.

In the present invention, FIGS. 7, 8, 9, 10 and 11, show the rheological behavior of compositions of this invention. FIG. 7 is a graphic representation of the present composition of water (44.5 wt %), isopropyl alcohol (55 wt %), and xanthan (0.5 wt %) showing the response of the apparent viscosity in centipoise versus the shear rate at 20° C. Note the similarity of this flow behavior to that of the composition shown in FIG. 9.

These include the viscosity-shear rate effect translated directly to viscosity-airspeed effect, which is a more practical correlation for aeronautical purposes.

FIG. 8 is a graphic representation of apparent viscosity versus shear rate.

It compares the commercially available deicing composition KILFROST® ABC 3 (propylene glycol with toxic and environmentally detrimental additives) with a version in accordance with this invention having an approximate composition of water (44.5 wt %), isopropyl alcohol (55 wt %), and xanthan (0.5 wt %). Note the higher near static viscosity and rapid shear thinning of the composition of the present invention.

FIG. 9 is a graphic representation of the apparent viscosity versus shear rate for one embodiment of the present invention's composition of water (44.5 wt %), propylene glycol (55 wt %) and xanthan thickener (0.5 wt %), at –20° C., 0° C., and +20° C. Note particularly the higher near-static viscosities and rapid shear thinning of the composition of the present invention.

FIG. 10 is a graphic representation of the magnified, low shear rate portion of the –20° C. shear rate of FIG. 9. It shows the maximum variation emphasized.

FIG. 11 is a graphic representation of one embodiment of the present invention of apparent viscosity and shear rate for water (44.625 wt %), propylene glycol (55 wt %) and xanthan thickener (0.375 wt %) at 0° C. and +20° C.

FIG. 12 is the magnified, low shear rate portion of the shear rate of FIG. 11, and further includes behavior at –20° C. It shows the maximum variations emphasized.

FIG. 13 is a graphic representation of one embodiment of the present invention showing apparent viscosity and shear rate for a composition of water (44.75 wt %), propylene glycol (55 wt %) and xanthan thickener (0.25 wt %) at 20° C.

Note the initial at rest (near-static) viscosities of the embodiment compositions of this invention and how their respective viscosities drop rapidly with increasing shear rates (for compositions for aircraft applications, corresponding to increasing airspeeds as the aircraft accelerates). In addition, the typical thickener, a food grade xanthan, is non-toxic and economical. Since the viscosity behavior of the new fluid has been shown to be completely reversible with shear rate, the fluid is therefore resistant to physical (i.e. pumping) damage. The fluid is also neutral and is typically non-corrosive. The composition requires no special handling or equipment. Expensive low shear pumps and special handling that current Type II fluids require is not needed; thus eliminating a two step process using two different fluid types, one to deice and one to provide anti-ice protection and additional equipment. The fluid of the present invention exhibits no viscosity loss due to pump-shear effects or rough handling; thus, its use reduces the uncertainty that the currently used fluids' unknown prior shear damage histories may place on the safety of the aircraft. The compositions of the present invention are also much more shear rate sensitive than currently used Type II fluids. This means the initial static viscosity can be and is significantly higher, resulting in more effective adherence (creating a better ice protection blanket) and less fluid usage. Due to the small quantity of thickener needed, it is very cost effective. Excellent spreadability and higher static viscosity (albeit very low dynamic shear viscosity) translates to longer holdover times with the use of a lower quantity of fluid. For the airport facility, this means less FPD fluid to drain per aircraft. Higher near-static viscosities are beneficial because they provide more durable FPD film protection and thus longer holdover times, as long as the viscosity still drops rapidly with shear rate. The more durable FPD film creates a blanket-like barrier, protecting against the incursion of precipitating ice forms, by being far less susceptible to displacement than are lower viscosity films. In support of this, in KILFROST's technical literature cited above, there is presented data correlating their improved static viscosity with improved (extended) holdover times. FIG. 8 shows the improved viscosity performance of the compositions of the present invention as compared to the fluids of the prior art.

For aircraft applications, it is important to note that the static viscosity of the present invention's composition (as shown in FIG. 8) is about a factor of at least ten higher than that of the prior art's upper value ($\eta_0$). The fluid composition of the present invention has higher static viscosity which drops quickly in response to increasing shear rate until it asymptotically falls to the same low value ($\eta_\infty$) of viscosity found in the prior art fluids, and is achieved in the equally brief span from 0 to 20 reciprocal seconds (20 sec$^{-1}$). The higher static viscosity characteristics of fluid compositions of this invention have a direct correlation with holdover time. That is to say, the higher static viscosity equates to longer holdover times, which is highly desirable. Yet the fluid's behavior of the rapid viscosity drop to the lower value is also a very desirable characteristic because it assures proper shedding from the aircraft's surfaces during takeoff for maximum effectiveness.

FIGS. 9 to 13 also show the typical temperature response of viscosity versus shear rate for the compositions of the present invention. When compared to the prior art in FIG. 8, the compositions of the present invention are superior, e.g. viscosity, non-toxic, neutral, etc. with the same propylene glycol as the FPD.

Xanthan—A selected xanthan polymer, *Xanthomonas campestris*, has a repeating unit (or mer) which consists of five sugar units: two mannose, two glucose and one glucuronic acid units polymerized into a backbone comprised of 1,4-linked β-glucose, identical in structure to cellulose, and having a polymer molecular weight of approximately two million. The trisaccharide side chains (two mannos, and one glucuronic) on alternating anhydroglucose units is the feature that distinguishes this moiety from cellulose, plus the pyruvate species at most terminal mannose units.

Other xanthomonas polysaccharides (e.g. xanthans), in addition to *Xanthomonas campestris* of the preferred embodiments, were examined as potential candidates for use as thickners for the aqueous freezing point depressant (FPD) embodiments of this invention. Some of these xanthomonas, for example, those described by Schuppner, (supra) are listed in Table 2.

TABLE 2

Comparison of Viscosities of various types of
Xanthomonas Hydrophilic Colloid Thickeners at
10.2 sec$^{-1}$ shear rates, at 20° C., in (CPs), Brookfield

| Bacterium Progenator, Aerobic Fermentation | Aqueous Conc. (% by weight) | | | |
|---|---|---|---|---|
| | 1.0 | 0.50 | 0.375 | 0.25 |
| Campestris* | 1800 | 911 | 688 | 451 |
| Incanae* | 1800 | — | — | — |
| Malvacearum* R2 | 1760 | — | — | — |
| Malvacearum XM13 | 1280 | — | — | — |
| Begoniae* S9 | 1560 | — | — | — |
| Begoniae S3 | 500 | — | — | — |
| Carotae XC11 | 1000 | — | — | — |
| Phaseoli | 20 | — | — | — |

The initial criterion for selection was the value of the 20° C. viscosity of a 1.0% by weight aqueous solution, as measured by a Brookfield viscometer at a constant shear rate of 10.2 reciprocal seconds (sec$^{-1}$). All viscosity measurements were made using a conventional Brookfield viscometer, spindle set SC 4-31, from Brookfield Engineering Laboratories, Inc., 240 Cushing Street, Stoughton, Mass. 02072.

Of the seven additional xanthomonas polysaccharides listed in Table 2, only those which exhibit viscosities above about 1500 cPs are considered suitable for use in anti-icing or deicing compositions of the present invention. The selection is based on experience of the non-Newtonian rheological behavior of the xanthomonas thickened aqueous solutions; on data of the essentially linear behavior of near-static viscosities of this type of thickener with respect to concentration, for example as shown in FIG. 14; and the correlation of the viscosities versus shear rate to the response of the campestris thickener, as shown, for example, in FIG. 13. Thus, the selection of xanthan thickeners (xanthomonas polysaccharide) having improved results in the present invention are those materials having a viscosity of about 1500 cPs or higher: e.g., *Xanthomonas campestris*, *Xanthomonas incanae*, *Xanthomonas malvacaerum* R$_2$, and *Xanthomonas begoniae* S9.

Aqueous xanthan (xanthomonas hydrophilic colloidal polymer) solutions of preferred embodiments of the present invention have surprising and unexpected rheological properties. Their pseudoplastic flow behavior is characterized by a dramatic decrease from a high value (obtained with only minimal quantity of thickener) as the shear rate is increased to a low value. The viscosity drop is rapid and yet fully reversible (nearly instantaneously) with no hysteresis. As discussed later, the solutions also have rheological yield points (dyne/cm$^2$), indicating a further uniqueness of simultaneously having an Ellis behavior at very low shear rates. This behavior is believed (Norton et al, cited above) to result from the formation of complex molecular aggregates by means of hydrogen bonding and physical entanglements of the long polymer chains. This highly ordered network and high degree of hydrogen-bonding accounts for the unusually high "static" viscosity.

Upon the application of increasing shear rate, there occurs a dramatic disaggregation of this ordered network and laminar-like alignment of the individual chains in submission to the imposed shear and/or stress. As soon as shearing ceases, the original aggregating forces come into play to rapidly reform the high viscosity configuration.

Many inorganic and organic polymer thickeners, and almost all polysaccharide thickeners dispersed in aqueous systems produce shear rate dependent fluid effects, pseudoplastic non-Newtonian flow, which is characterized by a decrease in apparent viscosity in response to increasing shear rate. At the same time, however, most polysaccharides and all polyacrylates have the undesirable behavior (for anti-icing/deicing fluid applications) that their viscosity decreases with time under applied steady shear stress, and are described as being thixotropic. These thixotropic polysaccharides solutions can include carboxy methyl cellulose, starch, alginates and the family of galactomannans derived from seeds which include guar gum, locust bean gum, and casia gum. Also included is the sulfated polysaccharide gum derived from marine algae, carrageenan.

Surprisingly and fortunately for the purposes of the present invention, xanthan gum is a polysaccharide thickener that retains very high and durable pseudoplastic behavior, but is not thixotropic. It has essentially no time-dependent plasticity. Xanthan thickened systems of the present invention thus do not flow or sag with time under the constant shear stress of gravity or steady wind. This is a desirable requirement for aeronautical applications, and for some nautical, civil (e.g. bridges, roads), and domestic (e.g., sidewalks) applications as well, especially on inclined surfaces.

The selected polysaccharide, a specific xanthan, is:

1. an exocellular hydrophilic heteropolysaccharide;
2. a natural occurring polysaccharide formed on terrestrial rutabaga plants soley by the pathogenic action of the bacterium, *Xanthomonas campestris*;
3. produced in-vitro by an aerobic fermentation process by the particular bacterium on specific organelles at the cell surface by complex enzymatic process;
4. a polysaccharide colloid-former which is produced commercially by in-vitro aerobic fermentation by *Xanthomonas compestris* bacterium submerged in medium containing a carbohydrate, trace elements, and other growth factors; and/or
5. now commercially available as a powder for food usage at a reasonable price.

Surprising and unexpectedly useful properties are obtained when an exocellular hydrophilic polysaccharide polymer, xanthan, is utilized as a water-dispersible thickener for mono- and polyhydric-based aqueous deicing and anti-icing fluids, especially in the resulting rheological behavior it produces. As compared to the rheological properties contributed to fluids of this nature by the known art thickeners, in the use of the composition the xanthan's thickened fluids have a number of attributes, some of which are useful in the present invention, e.g.:

1. only a small amount of thickener is needed to obtain a fluid having the desired high static viscosity;
2. the shear rate dependency of the fluids of the present invention (e.g. the rate at which viscosity drops from a very high static value, in a steep smooth and predictable manner, to an asymptotic very low value with increasing rate of shear, and is a highly sought after feature), far exceed that of other fluids as described herein; and
3. the shear rate dependency characteristic of the fluids of the present invention is not damaged by high shear forces, unlike that of the prior art, and thus it displays no hysteresis of viscosity with shear rate $\dot{y}$.

Therefore, the aqueous freezing point depressant (FPD) anti-icing or deicing fluids thickened by the selected xanthan polymer have inherent high static and low dynamic viscosity values that are less temperature variant than those of the commercially available prior art thickened fluids described herein. The art compositions have characteristics which are less of the elastic liquid type and tend more toward the viscous liquid in behavior.

Additional bacterium progenated heteropolysaccharide hydrophilic colloids, produced in-vitro by controlled aerobic fermentation by select bacteria strains and suitable as thickeners for fluids of the present invention include:

Welan, from bacterium Alcallgenes strain (ATCC 31555) has rheological properties in aqueous dispersion similar to *Xanthomonas campestris,* but with increased viscosity at low shear rates and even improved thermal stabilities.

Rhamsan, from bacterium Alcallgenes strain (ATCC 31961) has rheological properties in aqueous dispersion similar to *Xanthomonas campestris,* but also having very high static viscosities at low concentrations.

Beijerinekia Indica, from bacterium *Azotobacer indicus,* in aqueous dispersions are viscosity reversible and pseudoplastic, stable over a wide temperature range and exhibit higher static viscosities (at low concentrations) than even most xanthanes.

Gellan, from bacterium *Pseudomonas elodea.*

The present anti-icing and/or de-icing fluid is formulated around a type of hydrophilic colloidal polymers, preferably comprising of heteropolysaccharides that are usually manufactured in-vitro by the action of bacterial aerobic fermentation. That process results in a simple, one-component thickening agent, e.g. a xanthan, that readily combines with a non-toxic, freezing point depressant aqueous fluid to give continuous phase stable solutions having improved Type II anti-icing fluid behavior and having improved holdover times. The aqueous solution provides the desired anti-icing behavior over a practical range of operating temperatures. Further, the entire formulation is comprised of food grade constituents, and thus is essentially non-toxic.

With the use of the essentially a mono-layer forming hydrophilic-hydrophobic constituent, e.g., (1-n-dodecanol) constituent, extended holdover times are also achieved, which are in excess of the times characteristic of the current state-of-the-art fluids. The hydrophobic upper layer formed constitutes an effective barrier to penetration by ambient precipitation, e.g. freezing rain or drizzle, thereby minimizing dilution or washing away of the protective barrier coating.

The deicing fluids described by Ma, et al., U.S. Pat. No. 4,954,279 and König-Lumer, et al., U.S. Pat. No. 4,358,389 form gels.

In contrast, the solutions of the present invention typically require no oil-based micro-emulsions for fabrication or for storage stability and do not form gels. The fluids of the present invention have high static viscosities to provide improved durable icing protection coverage prior to aerodynamic air flow, and which then drop to ensure complete coating removal by airflow during the aircraft's take-off and prior to flight. This viscosity decrease, as the shear rate increases, is substantially instantaneous and is also fully reversible. Further, the fluids of the present invention have excellent thermal stability, and their viscosities are essentially constant over the range of 0° to +80° C. They possess finite rheological yield strengths (Ellis type rheological behavior) that must be overcome prior to any fluid flow, but unlike all conventional Type II fluids, are not thixotropic. Thus, they present no time-dependent plasticity (e.g. gravity sag). Nor do they demonstrate any undesirable permanent shear damage or hystersis behavior, a deficiency that, to the best of our present information, characterizes all other currently available pseudoplastic FPD fluids. Although the xanthan thickeners are synthetically produced (in-vitro) food grade heteropolysaccharides, (for example by the genus of bacterium, xanthomonas) they do not appear to be susceptible to microbial or fungal attack (nor are the polyacrylate polymers), prior to application. However, after spraying and use, they are consumed by these natural agents present in the local environment (unlike the acrylates) to greatly reduce any environmental impact.

Ma et al. describes using a de-icing composition using ethylene glycol and other alcohols with a xanthan gum as an optional (preferred) thickening agent for anti-icing fluids. A water-insoluble mineral oil in micro-emulsion is added to keep the fluid as a homogenous two-phase blended suspension (lyophobic/lyophilic) system, and to prevent gelling or phase separation caused viscosity decrease (either of which renders the fluid useless) from occurring when the composition is stored at sub-zero temperatures for prolonged period of time. Ma, et al. discloses at column 5, line 38, et sec., "the partially polar compounds comprise at least a portion of the oil and are provided in an amount of about 0.1 to 2.5% by weight based on the total composition. The partially polar compounds will usually comprise a micro-emulsion of micelles. The total oil is an amount up to about 5% by weight based on the total composition and when oils other than partially polar compounds are used, they are prefereably present in amounts of at least about 0.01 % by weight of the total composition. The amount of such oil present in the micro-emulsion with the continuous phase components of the composition of this invention should be in the range of from 0.01 % to 5.0% by weight based on the total weight of the composition."

In contrast, the present composition does not require the addition of mineral oil as a micro-emulsifier to form tiny micelles since the xanthan gum type that is used goes readily into solution with aqueous anti-icing fluids, using conventional mixing procedures. Also, the present composition is cold-storage stable and has been freezer stored for over three months with weekly testing which confirms that there is no change in desired chemical or physical properties. Unlike the fluids of the Ma et al. patent (without the micro-emulsion of water insoluble oils), the fluids of the present invention show the ability to maintain their original flow characteristics, clarity, or storage ability (thus showing no tendency to gel) even after prolonged cold storage.

The viscosity versus shear rate rheologial data presented in FIG. 25 represents the results of evaluating small portions, each taken from the fluid stored in a freezer in a closed glass container. These samples were warmed slowly to room temperature (around +20° C.), also in a closed glass container, and then evaluated for shear rate dependency of viscosity using the same Laboratory Brookfield Viscometer that was used throughout the development work herein. A comparison was made of each sample's characteristic with the original data. No changes were observed throughout the test serves, which lasted for 106 days of cold storage viscosity tests (and continues). (See FIG. 25).

While not wanting to be bound by theory, the following explanation is presented. Viscosity moduli are generally far more temperature dependent than are elastic moduli. Thus, referring to textbook FIGS. 18 and 19, it is seen that a temperature change that would decrease (or increase) the value of the viscous modulus would have a cosine of $\phi$ effect on the resultant ($\tau$), and be far more dramatic on (FIG. 19), the viscous type liquid, than on (FIG. 18), the elastic type liquid, (e.g. xanthan), even though they both have the same measured viscosity. Shear stress (τ) measured at a constant shear rate (ẏ) gives resultant viscosity, η, so this is what is generally measured by a viscometer. Note: τ/ẏ=viscosity. Note: Xanthan behaves as an elastic liquid when in aqueous dispersion. The lower variation of viscosity with temperature is a very valuable feature for Type II thickened FPD anti-icing fluids for aircraft reasons, e.g. formulation, storage, shelf-life. Low dependence of viscosity with variation of temperature is a very desirable feature for Type II thickened FPD anti-icing fluids for the following reasons:

Safety—Hold over times and fluid release speeds are less affected by weather-related temperature fluctuations.

Consistency and Predictability—assurance that the desired characteristics hold even if the temperature changes.

Economics—a single given design viscosity can be tailored for a specific use, rather than needing a set of solutions for various encountered temperatures.

Hydrophobic Thin layer—A hydrophobic very thin layer surface, described herein as essentially a monolayer, is formed on the exterior surface (or surfaces) of the fluid composition applied to the structure to be given ice protection, by the incorporation of component (e), the primary unbranched aliphatic alcohol, such as 1-dodecanol. Presumably, the hydrophilicity of the hydroxyl end align that end of the molecule towards the aqueous FPD, while the opposite end of the hydrocarbon chain is repulsed to form a hydrophobic layer.

The 1-dodecanol, as an additional component to the FPD fluid, imparts two very desirable properties. First, it produces a hydrophobic outer layer to enhance the ability of the applied ice protection fluid to resist ambient moisture incursion. This feature produces an extended holdover time for aircraft, and added weather resistance and durability for other uses. The hydrophobic layer presumably is achieved by the 1-dodecanol's having a polar hydroxyl end group with a strong hydrophilic affinity to the aqueous fluid surface, while the aliphatic chain portion is repelled. This type of structure causes a close-knit parallel alignment of the linear molecules to create a paraffin-like facade or exterior layer that limits moisture attraction and incursion.

1-Dodecanol, while not very soluble in water at room temperature, is readily soluble (to extents suitable for the purposes of this invention) in at least the following: propylene glycol; blends of propylene glycol and water; blends of propylene glycol, xanthan (and other polysaccharide gum thickeners) and water; blends of propylene glycol, xanthan gum, isopropyl alcohol (2-propanol) and water. Incorporation of 1-dodecanol to all the various ice protection compositions of this invention indeed has been shown to impart a hydrophobic outer layer which then is better able to resist drizzle or rain droplet incursions. Both clear water and also water dyed to enhance observabilty when applied topically in the form of droplets remained beaded without dissolving into the bulk of the coating.

Second, as an unexpected discovery, (in the embodiment compositions of this invention that contain small (or no) amounts of 1-propanol), 1-dodecanol apparently forms a hydrogen-bonded complex of the hydrated xanthan thickener. This property permits the FPD fluid to be foamed to a creamy homogenized fine consistency during application, creating a highly stable and mechanically firm, better clinging (especially to inclined or complex surfaces), durable and a long-lived expanded layer of FPD fluid. This foaming of the 1-dodecanol compositions is readily achieved by conventional mechanical agitation with aeration. The foam is capable of being pumped for conventional nozzle spray application with no loss of rheological FPD properties. Alternatively, foaming occurs at the nozzle, which is modified for this purpose. Surprisingly, while the foamed versions of the fluid display significantly higher static viscosity than the same fluid has prior to foaming, the viscosity versus shear rate dependency was found to be identical to that of the fluids of FIGS. 11 and 12. This result serves to indicate that the shear thinning behavior appears to have remained unaffected by the foaming action. Resistance to "rain" of the foamed fluids appears to be significantly improved, with the water droplets observed to be beading on the hydrophobic surface. While not wanting to be bound by theory, this beneficial feature may be accounted for as follows: At each interface between the liquid phase and the gas phase of the tiny bubbles in the foam, there is presumed to exist the said monolayers of 1-dodecanol, this large multiplicity of monolayers thus magnifies the hydrophobic affect seen as an even greater resistance to liquid water incursion (dilution).

Initial observations indicate that many typically used organic surfactants and also boric acid (used to form gels with many polysaccharides), unlike 1-dodecanol, were incapable of producing a suitable foam. It was further observed during the research leading to this invention, that the presence of an optional FPD component, 1-propanol, in any useful amount, effectively inhibited the 1-dodecanol foaming effect. This unanticipated discovery is deemed highly advantageous for the isopropanol-type compositions intended for use as windshield ice protection. The presence of the long chain alcohol is able to provide the desired hydrophobicity to extend the fluid's protective capability, without the possibility of wiperblade motion induced foaming, which obstructs driver vision.

The apparatus to apply the liquid composition to the surfaces of objects for anti-icing/deicing purposes is conventional in the art or can be adapted from existing equipment. For example, for application of the fluid to aircraft, U.S. Pat. No. 5,104,068 describes the known art and also teaches its advance.

Preferred Embodiments—Preferably, the amount of water in the composition according to the present invention is between about 40.0 and 86.0 weight percent of the sum of weights of water and FPD(s), more preferably between about 40.0 and 80.0 weight percent, and especially between about 40.0 and 50.0 weight 10 percent.

Preferably, the freezing point depressant (FPD) is present in the composition in between about 14.0 and 60.0 weight percent of the water and FPD combined weight, more preferably between about 20.0 and 60.0 weight percent, and especially between about 50.0 and 60.0 weight percent.

Preferably, the thickener is a food grade xanthan, which is present in the composition in between about 0.01 and 10.0 weight percent, more preferably in between about 0.10 and 5.0 weight percent and especially between about 0.25 and 1.0 weight percent of the total composition.

Preferably, the optional monohydric alcohol is a $C_8$ to $C_{18}$ straight chain aliphatic primary alcohol, more preferably a $C_8$ to $C_{16}$, straight chain primary aliphatic alcohol, especially a $C_{10}$ to $C_{14}$, straight chain unbranched primary aliphatic alcohol, and specifically 1-dodecanol. Preferably, the monohydric alcohol is present in between about trace amounts, sufficient to form a thin layer on the exterior surface of the applied compositions, e.g. between about 0.01; and 5.0 weight percent, more preferably between about 0.10 and 5.0 weight percent and especially about 0.75% weight percent.

In a preferred composition for use on aircraft, water is present in the composition in between about 40.0 and 70.0 weight percent of the sum of the water and FPD weights, more preferably between about 35.0 and 55.0 weight percent, and especially between about 40.0 and 44.5 weight percent.

The freezing point depressant for aircraft applications is present in between about 40.0 and 60.0 weight percent of the combined FPD and water weight, more preferably between about 45.0 and 60.0 weight percent, and especially between about 50.0 and 60.0 weight percent.

The thickener as a sugar is preferably a food grade xanthan which is preferably present in between about 0.2 and 1.0 weight percent, more preferably in between about 0.25 and 0.75 weight percent and especially between about 0.45 and 0.55 weight percent of the total composition. Optionally, this composition for all uses, particularly aircraft applications, includes a monohydric alcohol 1-dodecanol, which is preferably present in between about 0.10 and 5.0 weight percent, more preferably between about 0.01 and 3.0 weight percent and especially between about 0.10 and 0.75 weight percent of the total composition.

In the embodiment compositions of the present invention, polymers of acrylates, acrylic acid, methacrylates or methacrylic acid are not present.

Isopropanol Additive—The combination of isopropanol as a major portion of the FPD blend with propylene glycol (PG) imparts certain beneficial characteristics. For example: in compositions of 45 wt % isopropanol (IPA) and 10 wt % propylene glycol (PG) and suitably thickened with xanthan, almost identical ice protection and rheological properties (compared to using only PG as the FPD, components using only PG as the FPD, i.e., using 55 wt % PG), are obtained. After application to the surface, the IPA/PG blend has a far less environmental impact on the airport environment. This is because of the IPA higher vapor pressure. This alcohol evaporates into the atmosphere where it is decomposed by ultra violet/air oxidation to carbon dioxide and water. Thus, the PG residue locally is reduced to less than one fifth initially, compared to an all glycol FPD fluid. Further, the IPA acts as an extender and a uniform distributor of the PG mix.

Improved Friction—Additionally, for roadways, walkways, bridges, etc. and certain portions of airport paving where improved friction would be deemed beneficial, applications of the composition includes added solids. A freezing point depressant (FPD) fluid composition, thickened as described herein, further includes friction enhancing agents(s) that are co-applied or sequentially applied to the surface where it is desired to provide both anti-ice/deice protection and increased friction/traction. Such friction enhancing agent(s) are comprised of suitably fine pulverized solid(s) having the following desirable features: (a) the pulverized solid particles are essentially sharp cornered or edged, (b) are not soluble nor significantly softened by the FPD fluid mixture, (c) preferably biodegradable and non-toxic, and (d) non-corrosive in the FPD fluid mixture. Examples of these solids include, but are not limited to, pulverized organic nut shells, husks, kernels, seeds, bark, and wood fragments, and certain synthetic polymers, and for selected situations, sand. It should be noted that deliberate ingestion of certain nut shell fragments below a particular size is universally used by maintenance facilities to remove encrusted coke and deemed beneficial to jet aircraft engines.

Smart Fluids for Use as Anti-icing Fluids or Deicing Fluids

A "one-fits-all" Type II deicing fluid has some drawbacks. Each size and type of aircraft has a characteristic rotational airspeed that itself is dependent on many internal and external factors, not the least of which include density altitude and loading factors. There exists a safety-motivated need for the deicing or anti-icing equipment operators on the takeoff airfield to be able to tailor the Type II fluid in-situ to best fit the requirements of that specific aircraft at that specific application time and place. This tailored result is referred to herein as "a smart fluid". With the teachings of the present invention, such a capability now becomes a practical reality. Xanthan thickened FPD fluids exhibit useful and desirable pseudoplastic flow (with little or no thixotropic time-dependent plasticity). Further, as shown in FIGS. 3, 4 and 5, the fluids have a yield value. That initial value of finite shear stress (also known as yield stress) resistance, which must be exceeded to initiate fluid flow, is determined for a given set of conditions such as fluid temperature and thickener concentration. The smart fluid is described herein with reference to FIGS. 16 and 17.

FIG. 16 graphically presents a plot of the square root of apparent viscosity ($\eta$) plotted against the reciprocals of the square root of shear rate $\dot{y}$.

$$\eta^{1/2} = \eta_\infty^{1/2} \tau_0^{1/2} \dot{y}^{-1/2}$$

$\eta$=viscosity (cPs)

$\dot{y}$=shear rate (sec$^{-1}$)=dy/dt $\tau_0$ =yield point (dyne/cm$^2$)

$\tau_0^{1/2}$=slope $\eta_\infty$=infinite shear rate viscosity, intercept with ordinate.

FIG. 16 describes an isopropyl alcohol-propylene glycol embodiment of this invention at 20° C.:

52.1 wt % isopropanol 5.2 wt % propylene glycol 0.4 wt % xanthan 42.3 wt % water The following are obtained from the data of FIG. 16:

$\tau_0$=25.5 dyne/cm$^2$ $\eta_\infty$=404 cPs

FIG. 17 is a graph similar to FIG. 16, but using data characteristic of different composition of this invention, as shown:

55.0 wt % propylene glycol 0.5 wt % xanthan 44.5 wt % water

The equation defining the relationships described above for FIG. 16 applies here as well. Thus:

$\tau_0$=51.6 dyne/cm$^2$ $\eta_\infty$=169 cPs

The desired characteristics for a FPD fluid to function as a suitable Type II ice protection fluid, include how its viscous and structural integrity properties are optimized to assure that, statically, an effective ice protective blanket covers a surface e.g., an aircraft's critical flight surfaces. The structural (i.e. viscosity) integrity to this layer rapidly disintegrates to a low viscosity, easy flowing fluid under the aerodynamic airflow shear just prior to the aircraft attaining its liftoff airspeed. The fluid readily flows off the critical exterior surfaces, carrying away any ice that had accreted superficially, so that the aircraft then is essentially clean aerodynamically at or immediately before lift off.

FIG. 20 shows a graphic representation of the rheological behavior of Newtonian fluid and a typical pseudoplastic Type II anti-ice or deicing fluid (ADF). As indicated in textbook derived FIG. 20, the calculation of viscosity from viscometer readings assumes that the fluid has Newtonian flow and its viscosity is constant for all shear rates. That is what is meant by the "apparent viscosity" of a non-Newtonian fluid: it is the viscosity which would support the measured shear stress at a specific applied shear strain rate if the fluid has Newtonian flow properties. Of course, for non-Newtonian fluids the apparent viscosity is different for every different shear rate. Thus, to gain an accurate picture of the state of a non-Newtonian fluid, viscosities must be measured at several shear rates.

In the present invention, a composition is formed in-situ whose initial unsheared "static" viscosity corresponds to a pre-specified or required yield value, i.e. the yield value obtained for the composition by the incorporation of a given amount of xanthan, predetermined by a plot of the square root of viscosity versus shear rate (for the intended temperature) to obtain the provided slope. The slope squared provides the yield point, which then is correlated to the equivalent aerodynamic shear speed, representing the value where the applied fluid is essentially all shed due to shear thinning.

For pseudoplastic rheological behavior, a relationship exists between apparent viscosity $\eta$, the limiting (lowest) high shear viscosity $\eta_\infty$, the shear rate $\dot{y}$, and the yield point for xanthan thickened FPD fluid, $\tau$. Using these notations, then, the following equation is obtained:

$$\eta^{1/2} - \eta_\infty^{1/2} = (\tau_0/\dot{y})^{1/2}$$

or (in the familiar form of analytical geometry, y=mx+b):

$$\eta^{1/2} = \tau_0^{1/2} \dot{y}^{-1/2} + \eta_\infty^{1/2}$$

and the above equation suggests that plotting the square root of viscosity (the dependent variable) against the reciprocal of the square root of shear rate. Plotting of the data produces a graph having a straight line whose slope is the constant (for a given temperature and thickener concentration) $\tau_0^{1/2}$, the square root of the yield point. The intercept with the ordinate corresponds to $\eta_\infty^{1/2}$. At high shear rates, there is a tendency to diverge from the straight line, and extrapolation to intercept is required to derive the limiting or infinite shear rate viscosity, $\eta_\infty$. FIGS. 16 and 17 show this type of plot at 20° C. for two different compositions of FPD thickened with different xanthan concentrations, which produce different viscosity responses to shear rate, and consequently individual slopes, $\tau_0^{1/2}$. An example is given here that may be of particular interest for purposes of aircraft protection, note the $\eta_\infty$ and $\tau_0$ values (FIG. 17) for a FPD concentration of approximately 55 wt %, and xanthan thickener of 0.5 wt %. Even at 20° C., the low shear rate (nearly static) viscosity as shown in FIG. 13 is very high at 56,500 cPs and rapidly dropping to about 400 cPs at 20.5 reciprocal seconds, already close to limiting high shear viscosity, $\eta_\infty$, of 169 cPs in FIG. 17. From FIG. 17, one is able to determine from the slope ($\tau_0^{1/2}$) the yield stress value of 51.6 dyne/cm$^2$ (0.108 lbf/ft$^2$).

In order now to correlate this yield strength (stress) to an airspeed, some simple but technically acceptable assumptions are made, to simplify the calculations:

Dynamic Pressure $q = \frac{1}{2}\rho U^2$ where $\rho = 0.002378$ lb sec$^2$/ft$^4$ Drag D=0.5 $\rho U^2 C_D S = q C_D S$ wherein S is surface area, U is the freestream air (wind) velocity, $\rho$ is density altitude of air $C_D$ is the aerodynamic drag coefficient, q is dynamic pressure, Also assume, to simplify the calculations, that:

(1) Reynolds $R_e = 0.5 \times 10^5$ (100 Kts)

(2) $C_D$ flat plate tangential drag coefficient 0.01→0.007 (taken from aerodynamic tables)

(3) Viscosity profile at −20° C. gives a calculated yield stress of 71.8 dyne/cms$^2$ (0.150 lbf/ft$^2$)

Performing the math calculations produce the data for the following tabulations for the selected 55 wt % FPD with 0.5 wt % xanthan thickener:

+20° C. Yield stress equivalent airspeed $C_D = 0.01$ 56.5 Knots (Kts)

$C_D = 0.007$ 67.7 Knots (Kts)

−20° C. Yield stress equivalent airspeed $C_D = 0.01$ 66.6 Knots (Kts)

$C_D = 0.007$ 79.5 Knots (Kts)

With knowledge of the viscosity dependence on temperature and as a function of xanthan concentration, the applications operator may use various thickener blending ratios (for a given temperature) in-situ with suitable blending nozzle apparatus to effect a new technique producing "smart fluid" icing protection tailored for each aircraft treated.

This suggests the possibility to select the components and produce an anti-icing freezing point depressant fluid composition having rheological properties which are specifically tailored to meet the specific aerodynamic requirements of the surface to be anti-iced. This process includes, but is not limited to selecting and producing an anti-icing composition whose rheological properties are specifically tailored to meet the aerodynamic requirements for the surface to be anti-iced, either that the freezing point depressant fluid composition be all removed, i.e. shed, peeled off; or that the fluid must be able to withstand without shedding, for cases such as nautical powerlines, bridges, etc. Since xanthan's overall concentration affects on the fluid viscosity far exceeds the contribution of any other component, the composition determination for aerodynamic tailoring reduces to finding the xanthan concentration by:

(a) selecting the surface to be given icing protection;

(b) utilizing the design conditions of air velocity and ambient temperature, determine the drag affect experimentally, or from the following equation:

$$D/S = \frac{1}{2}\rho C_D U^2$$

wherein:

D is the drag for unit area S,

D/S is the drag affect, $\rho$ is the density altitude of air, $C_D$ is the aerodynamic drag coefficient, and U is the air velocity;

(c) correlating the yield stress, $\tau_0$, to the drag affect, using the equation:

$$\tau_0 = D/S;$$

(d) having obtained from step (c) the $\tau_0$ value of yield strength (or stress), determine the near static viscosity ($\eta_0$), utilizing the data typical of that presented in FIG. 17, where the slope of that line is the square root of $\tau_0$:

$$\eta_o^{1/2} = \eta_\infty^{1/2} + \tau_0^{1/2} \dot{y}^{-1/2},$$

wherein:

$\dot{y}$ is the shear rate (sec$^{-1}$), dy/dt, $\eta$ is any viscosity (cPs) from $n_o$ to $\eta_\infty$, $\eta_0$ the near static viscosity, essentially zero shear rate, $\eta_\infty$ is the limiting or infinite shear rate viscosity, and $\tau_0$ is the yield strength or stress (dyne/cm$^2$), noting that $\eta_\infty$, the limiting viscosity at infinite shear rate, is a very low value of about cPs=200 to 300 as compared to the 50,000 cPs or higher values for $\eta_0$, the near static viscosity, equating the $\eta_\infty^{1/2}$ term to zero and omitting it from the equation, and maintaining acceptable accuracy;

(e) squaring the remainder of the equation from (d) to obtain:

$$\eta = \tau_o \dot{y}^{-1},$$

$$\eta_0 = \tau_0 \dot{y}_0^{-1},$$

as a reasonable approximation, wherein $\dot{y}$ (the shear rate) used to measure the near static low shear rate viscosity is approximately 0.106 sec$^{-1}$, a constant, which allows the direct determination of $\eta_o$ that correlates to $\tau_o$;

(f) utilizing the data typical of that presented in FIG. 14, to determine the concentration (wt %) of xanthan in solution needed to provide the desired viscosity ($\eta_o$);

(g) adjusting the result of step (f) for any temperature corrections necessary by utilizing data from FIG. 15; and (h) obtaining the anti-icing composition tailored to the specific application.

Thus, the composition determinations for aerodynamic tailoring (e.g. smart fluid) reduces essentially to the determination of the appropriate thickener (e.g., xanthan) concentration.

One example of blending consists of mixing during aircraft application proper ratios of the same FPD concentrations but with differing thickener concentrations in order that the desired final viscosity is achieved.

While these discussions above concerning the technique taught relating to the so-called "smart fluid" used a particular fluid composition as an example, it is intended that this invention includes and applies equally to foamed versions of the FPD embodiment compositions of this invention, especially considering their unusual long-term durability.

It is suggested above that various physical treatments of the FPD compositions of the embodiment of this invention result in enhanced properties. In the case of the foamed compositions, two alternative methods are present. One comprises prefoaming and then pumping to a suitable nozzle for spray application. The second alternative requires a modification of existing nozzles and/or adaptors that would froth/agitate with aeration the FPD solution during application. Nozzles designed for this "prefoamed" use are commercially available in the current state of the art. For the so-called "smart fluid" ratio blending in-situ to meet specific aircraft-rotation speeds, a simple throttling/ratioing precontrol dictated to by an appropriate computer preprogrammed is also well within today's technology.

The present invention is described in greater detail by the following Examples. These examples are used to further explain and described the present invention. They are not to be construed to be limiting of the invention in any manner.

GENERAL—All "apparent viscosity" measurements were made on a conventional Brookfield viscometer, using a SC4-31 spindle/cup set.

The xanthan is available from many commercial sources and in a variety of grades. The xanthan used in this invention was obtained from the Kelco Division of Merck, Inc. of San Diego, Calif., grade KELTROL T®. It was used directly without further purification. The compositions are prepared in a conventional manner. The order of addition or combination is generally not critical.

EXAMPLE 1

Isopropanol Compositions (Glass Surfaces, Automobile Windshields, Etc.)

(a) A composition was prepared containing 55.0 wt % isopropanol, 44.0 wt % water, 0.75 wt % xanthan, and 0.25 wt % 1-dodecanol. These components were combined, and applied to the windshield of an automobile. This composition formed a protective blanket to prevent subsequent ice accretion and adherence, and render ice on the glass to be soft and easily removed. The application of the composition occurs by using a mechanical "spritzer" type hand sprayer. However, other techniques which include a pressurized can, or by the windshield washer system which has been suitably modified. Overnight windshield ice protection is possible by spraying prior to overnight ice or frost formation.

The fluid composition was applied in early evening to portions of the windshield of an automobile parked outdoors under freezing conditions in early March 1994. Upon returning to the automobile at 7:30 the next morning, the surfaces where the fluid composition was applied had no frost. On the other hand, all other external glass surfaces and were frozen over with hoar-frost. Clearing the unprotected windshield required time and heat and/or considerable manual scraping. One revolution of the windshield wiper completely cleared the fluid from the windshield surface and the windshield was sufficiently clean and clear for immediate operation of the automobile.

(b) and (c) The compositions for FIGS. 7 and 8 were 52.1 and 45.0 wt % isopropanol; 5.2 and 10.0 wt % propylene glycol; 0.4 and 0.5 wt % xanthan; and 42.3 and 44.5 wt % water; respectively. These components were combined mixed and applied to the surface to remove formed ice or to cause any ice formation to be soft and easily removed. 1-Dodecanol is an optional added component included as a means of forming a monolayer and further has the advantage of being transparent and not obscuring vision. The ice was not formed at −40° C.

The shelf life of the present composition was in excess of 36 months; samples stored in sealed light-tight containers and subsequently evaluated exhibited little or no observed degradation in performance when compared to freshly prepared compositions.

(d) Similarly, when Example 1(b) or 1(c) are repeated except that the xanthan concentration was 5 percent by weight and the water was 40 percent by weight, similar anti-icing or deicing results were obtained; including no ice formed at −40° C.

(e) Similarly, when Example 1(b) or 1(c) were repeated except that the xanthan concentration is 0.01 percent by weight and the water is 40 percent by weight, similar anti-icing or deicing results were obtained; including no ice formed at −40° C.

EXAMPLE 2

Isopropanol Compositions (Aircraft, Runway, Roadway, Etc.)

(a) and (b) The compositions containing 45.0 wt % isopropanol; 10.0 wt % propylene glycol, 0.1 or 5.0 wt % xanthan, and the remainder being water were prepared. The amount of xanthan is dictated by the desired "static" unsheared viscosity as prescribed for the specific application. No ice formed at −40° C.

(c) Monolayer forming 1-dodecanol (1.0 wt %) to enhance durability, was added to the compositions of 2(a) or 2(b) (the remainder is water), combined and applied to the surface to provide icing protection. The ice protection results were similar to those of Example 2(a).

(d) Similarly, when Example 2(a) or 2(b) are repeated with an addition of 0.1 wt % of 1-dodecanol, similar anti-icing and deicing results are obtained.

EXAMPLE 3

Propylene Glycol Compositions (for Aircraft)

(a) A composition containing 55.0 wt % propylene glycol, water 44.5 wt %, xanthan 0.5 wt %, and 1-dodecanol varying in quantity, from just a trace (sufficient to form an exterior thin coating, essentially a monolayer about 0.01 wt %) or approximately 2 wt %.

For applications to aircraft surfaces, the resultant Type II layer formed for anti-ice protection ranges in thickness from about $25 \times 10^{-3}$ mm to approximately 10.0 mm.

The "shelf-life" of this embodiment composition was in excess of 32 months at about 0° C. Samples stored in sealed light-tight containers and subsequently evaluated exhibited no observed degradation in anti-icing or deicing performance when compared to freshly prepared versions.

(b) Similarly, when the Example 3(a) embodiment was reconstituted, except that the 1-dodecanol concentration in the composition was increased from the trace monolayer amount, 0.01 wt % or 5 wt %, depending on the aircraft application, this enables the forming of a stable, firm, long lived, homogenized foam with the hydrated xanthan thickener, upon application of mechanical agitation and aeration (a process similar to making whipped cream).

The beneficial results of foaming the Type II fluids of this invention upon application also includes producing a protective "blanket" layer that is far thicker for a given amount (or weight) of fluid applied, and results in a better barrier to ice accretation, than if applied unfoamed.

EXAMPLE 4

Higher Thickener Concentration Propylene Glycol Composition (Nautical Application)

(a) and (b) An aqueous composition is proposed containing 55.0 wt % (of the combined glycol and water weight) propylene glycol (as FPD), xanthan of 0.5 wt % or 20 wt % can be prepared. The remainder is water. The amount of xanthan is dictated by the required "static" unsheared viscosity as prescribed for those various specific nautical (shipboard) applications (such as above deck mesh traps, rigging, weather decks, etc.) where tenacity, resistance to wind shear and mist dilution are very desirable features. Referring to the graphic data of FIG. 14, an extrapolation of the line maybe used to predict the approximate xanthan concentration necessary to obtain the desired "static" viscosity. Thus, for a given anticipated application, data from FIGS. 10, 11, and 13 predict that, while "static" viscosity is significantly increased with increase in the xanthan concentration, the dynamic viscosity drop due to shear rate increase results in about equally low values. This embodiment composition further contains 1-dodecanol varying in quantity from a trace (0.01 wt %), (sufficient to form an exterior coating, essentially a monolayer), or 2 wt %. The remainder of the composition is water.

(c) Similarly, when Example 4(a) or 4(b) composition blending is repeated, except that the 1-dodecanol concentration is increased from the trace monolayer forming amount 0.01 wt % or 5 wt %, depending on the intended nautical application. This increase in dodecanol content enables forming a stable, firm, clinging, homogenized foam with the hydrated (i.e. water treated) xanthan thickener. The result of forming the foam is an increase both in tenacity and resistance to dilution of the composition.

For compositions of Example 4(a) and 4(b), ice generally will not form down to about −40° C.

EXAMPLE 5

Higher Thickener Concentration Isopropanol Compositions (Nautical Applications)

(a) A composition is proposed containing 45.0 wt % isopropanol (as one FPD), 10 wt % propylene glycol (as a second FPD) based on the combined weight of FPDs and water, and xanthan of 0.5 wt % or 20 wt % and the remainder is water. The amount of xanthan is dictated by the required "static" unsheared viscosity as prescribed for those various specific nautical applications (such as mesh traps stored above deck, rigging, weather decks, etc.) where the composition's tenacity, resistance to wind shear and mist dilution are very desirable features. Referring to the graphic data of FIG. 14, an extrapolation of the line is used to predict the approximate xanthan concentration necessary to obtain the desired "static" viscosity. Thus, for a given anticipated application, data from FIGS. 10, 11, and 13 confirm that, while "static" viscosity is significantly increased with increase in the xanthan concentration, the dynamic viscosity drop due to shear rate increase results in about equally low values. The result indicates a facility in spray application.

(b) The composition of Example 5(a) which further contains 1-dodecanol of 0.01 wt % (sufficient to form an exterior coating, essentially a monolayer), or 2 wt %. The remainder of the composition is water. For this composition ice will not form down to about −40° C.

EXAMPLE 6

Higher Thickener Concentration Isopropanol Compositions (Ice Protection of Powerlines, and Components)

(a) A composition is proposed containing 45.0 wt % isopropanol (as one FPD), 10 wt % propylene glycol (as a second FPD) based on the combined weight of FPDs and water; and xanthan of 0.5 wt % or 2.0 wt %. The remainder of the composition is water. The amount of xanthan is dictated by the required "static" unsheared viscosity as prescribed for those various specific nautical applications (such as above deck mesh traps, rigging, weather decks, etc.) where tenacity, resistance to wind shear and mist dilution are desirable features. Referring to the graphic data of FIG. 14, an extrapolation of the line may be used to predict the approximate xanthan concentration necessary to obtain the desired "static" viscosity. Thus, for a given anticipated application, data from FIGS. 10, 11, and 13 confirm that, while "static" viscosity is significantly increased with increase in the xanthan concentration, the dynamic viscosity drop due to shear rate increase results in about equally low values. The shear rate viscosity drop result indicates an ease of spray application.

(b) The composition of Example 6(a) which further contains 1-dodecanol of 0.01 wt % or 2 wt % (sufficient to form an exterior coating, essentially a monolayer) to approximately 2 wt %.

(c) Similarly, when Example 6(b) composition blending is repeated, except that an environmentally benign coloring agent, F.D.&C. food colorings (yellow #5 and blue #1), is included as a means of tracing visually the location and extent of applied fluid coverage.

For example, Examples 6(a), 6(b) and 6(c), ice generally will not form at down to about −40° C.

EXAMPLE 7

Higher Thickener Concentration Propylene Glycol Composition (Ice Protection of Powerlines, and Components)

(a) and (b) A composition is proposed containing 45.0 wt % isopropanol (as one FPD), 10 wt % propylene glycol (as a second FPD) based on the combined weight of FPDs and water, and xanthan of 0.5 wt % or 5 wt %. The remainder is water. The amount of xanthan is dictated by the required "static" unsheared viscosity as prescribed for those various specific nautical applications (such as mesh traps stored above deck, rigging, weather decks, etc.) where the composition's tenacity, resistance to wind shear and mist dilution are very desirable features. Referring to the experimental graphic data of FIG. 14, an extrapolation of the line may be used to predict the approximate xanthan concentration necessary to obtain the desired "static" viscosity. Thus, for a given anticipated application, data from FIGS. 10, 11, and 13 confirm that, while "static" viscosity is significantly increased with increase in the xanthan concentration, the dynamic viscosity drop due to shear rate increase results in about equally low values. The result indicates a facility in spray application. The composition further contains 1-dodecanol varying in quantity from just a trace to approximately 2 wt % (sufficient to form an exterior monolayer). The remainder of the composition is water.

(c) Similarly, when Example 7(a) or 7(b) composition blending is repeated, except that an environmentally benign coloring agent, F.D.&C. food coloring (yellow #5 and blue #1), is included (0.1 wt %) as a means of tracing visually the location and extent of applied fluid coverage.

(d) Similarly, Example 7(a) or 7(b) composition blending is repeated, except that 1-dodecanol concentration is added of 0.01 wt %, or 5 wt %, depending on the application. A stable firm, clinging homogenized foam with the hydrated (water treated) xanthan thickener is formed by aeration/mechanical agitation, which increases both the tenacity and resistance to dilution of the composition.

(e) Similarly, when Example 7(d) composition blending is repeated, except that an environmentally benign coloring agent, F.D.&C. food colorings (yellow #5 and blue #1), is included (0.5 wt %) as a means of tracing visually the location and extent of applied fluid coverage.

For compositions of Examples 7(a) to 7(e), ice does not form at down to about −40° C.

EXAMPLE 8

Holdover Time and Aerodynamic Shedding Tests

An anti-icing composition was prepared according to Example 3(a):

propylene glycol 54.9 wt. % water 43.7 wt %

Keltrol T (xanthan) 0.7 wt %

1-dodecanol 0.5 wt %

Schillling green (color) 0.2 wt %

In December 1995 and January 1996 this fluid composition was tested for holdover time and aerodynamic shedding performance according to SAE AMS 1428 specifications (1995). These tests were conducted at the University of Quebec at Chicontimi whose facilities are the only facilities in North America certified to perform holdover time and aerodynamic shedding performance tests. The composition passed the Type II requirements for both aerodynamic shedding performance and set a record for holdover time of 113 min. (Type II certification requires 30 minutes minimum.)

During the same time period, corrosion testing with respect to SAE AMS 1428(1995) specifications were conducted at Scientific Material International, Inc., Miami, Fla. The fluid composition conformed to specification on all tests completed thus far: sandwich corrosion, total immersion corrosion, and hydrogen embrittlement.

EXAMPLE 9

Holdover Time and Aerodynamic Shedding Tests

An anti-icing composition was prepared according to Example 3(a):

propylene glycol 54.9 wt % water 43.9 wt %

Keltrol T (xanthan) 0.5 wt %

1-dodecanol 0.5 wt %

Schillling green 0.2 wt %

This fluid composition was tested for holdover time and aerodynamic shedding performance according to SAE AMS 1428(1995) at the same location and under the same test conditions as in Example 8. The composition passed the requirements.

While only a few embodiments of the invention have been shown and described herein, it will become apparent to those skilled in the art that various modifications and changes can be made in the composition of the deicing or anti-icing fluid, which is environmentally benign, or is amenable to further degradation without departing from the spirit and scope of the present invention. All such modifications and changes coming within the scope of the appended claims are intended to be carried out thereby.

We claim:

1. An environmentally-friendly anti-icing or deicing composition, said composition comprises:

(a) water in between about 40 and 86 percent by weight of the combined weight of water and freezing point depressant;

(b) at least one non-toxic, water soluble, freezing point depressant selected from the group consisting of monohydric alcohols having from 2 to 6 carbon atoms, polyhydric alcohols having from 3 to 12 carbon atoms, monomethyl or monoethyl ethers of polyhydric alcohols having from 3 to 12 carbon atoms, and mixtures thereof wherein the amount of said freezing point depressant is between about 14 and 60 percent by weight of said combined water and freezing point depressant weights; and (c) a non-toxic thickener which is present in an amount between about 0.01 and 10 percent by weight of the total composition, said thickener is a xanthan which when combined with (a) and (b) provides a continuous liquid composition, wherein said liquid composition is a homogeneous, continuous single phase, and said liquid composition when formed has a high near-static initial viscosity above about 20,000 cPs when measured using a viscosity measuring device, and the formed liquid after being subjected to at least one external dynamic strain at a rate of at least 20 sec$^{-1}$ for at least 1.0 min., has a second, lower viscosity below about 1,000 cPs as measured using said viscosity measuring device, and upon removal of said external dynamic strain rate, within 10 min., said liquid composition has a third viscosity of within about 99.5% of said initial viscosity when said third viscosity is measured on said viscosity measuring device, with the proviso that the composition does not include a water insoluble liquid and with the proviso that the composition is not an emulsion.

2. The composition of claim 1 wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 5.0 percent by weight of the total composition, and the sum of components (a), (b) and (c) are at least about 90% by weight of the total composition.

3. The anti-icing or deicing composition of claim 1 wherein, the viscosity measurement is performed at between about −20° and +20° C.

4. The anti-icing or deicing composition of claim 3 wherein, the viscosity measurement is performed at about ±20° C.

5. The composition of claim 2 wherein the xanthan is a bacterium produced hydrophilic heteropolysaccharide present in between about 0.01 and 10% by weight of a total fluid composition.

6. The composition of claim 5 wherein the polysaccharide is produced using a bacterium selected from the group consisting of Welan from bacterium Alcaligenes, Rhamstan from bacterium Alcaligenes, Beijerinckia Indica from bacterium *Azolobacter indicus,* Gellan from bacterium *Pseudomonas e iodea,* and *Xanthomonas campestris, Xanthomonas incanae, Xanthomonas malracearum* R-2, and *Xanthomonas begoniae* S-9.

7. A process for anti-icing or deicing an exterior surface of an aircraft, wherein the anti-icing and deicing composition of claim 1 is applied to an exterior surface of an aircraft wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 5.0 percent by weight of the total composition, and the sum of components (a), (b) and (c) are at least about 90% by weight of the total composition.

8. A process for the deicing of an aircraft, wherein said process comprises:
contacting an exterior surface of an aircraft in need of deicing with an effective amount of the composition of claim 1 to anti-ice or deice said aircraft surface.

9. A process for the anti-icing or de-icing of an exterior surface of a motor vehicle, wherein the anti-icing and deicing composition of claim 1 is applied to an exterior surface of a motor vehicle wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 5.0 percent by weight of the total composition, and the sum of components (a), (b) and (c) are at least about 90% by weight of the total composition.

10. A process for the anti-icing or deicing of an exterior surface of a motor vehicle, said process comprises:
contacting an exterior surface of a motor vehicle with an effective amount of the composition of claim 1 to anti-ice or deice said surface.

11. A process for the anti-icing and deicing of a road, street, or sidewalk surface, which process comprises:
contacting a road, street or sidewalk surface with an effective amount of the composition of claim 1 to anti-ice or deice a road, street or sidewalk surface, wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 5.0 percent by weight of the total composition.

12. A process for the anti-icing or deicing or a road, street or sidewalk surface, said process comprises:
contacting a road, street or sidewalk surface, in need of anti-icing or deicing with an effective amount of the composition of claim 1 to anti-ice or deice said surface wherein said composition further includes an effective amount of pulverized solid particles to increase friction of the surface.

13. A process of anti-icing or deicing a nautical vessel or nautical equipment wherein the composition of claim 1 is applied to an exterior air exposed surface of a nautical vessel or to exterior nautical equipment to anti-ice or deice an exterior surface, wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 5.0 percent by weight of the total composition, and the sum of components (a), (b) and (c) are at least about 90% by weight of the total composition.

14. A process for the anti-icing or deicing of a nautical vessel or nautical equipment, wherein said process comprises:
contacting a surface of a nautical vehicle or nautical equipment with an effective amount of the composition of claim 1 to anti-ice or deice said surface.

15. An environmentally-friendly anti-icing or deicing composition, wherein said composition comprises:
  (a) water in between about 40 and 86 percent by weight of a combined weight of water and freezing point depressant;
  (b) at least one non-toxic, water soluble, freezing point depressant selected from the group consisting of monohydric alcohols having from 2 to 6 carbon atoms, polyhydric alcohols having from 3 to 12 carbon atoms, monomethyl or monoethyl ethers of polyhydric alcohols having from 3 to 12 carbon atoms, and mixtures thereof wherein the amount of said freezing point depressant is between about 14 and 60 percent by weight of said combined water and freezing point depressant weights;
  (c) a non-toxic thickener which is a xanthan and is present in an amount between about 0.01 and 10 percent by weight of the total liquid composition, which when combined with (a) and (b) provides a continuous liquid composition, wherein said liquid composition is a homogeneous, continuous single phase, and said liquid composition when formed has a high near-static initial viscosity above about 20,000 cPs when measured using a viscosity measuring device under specified conditions, and the formed liquid after being subjected to at least one external dynamic strain at a rate of at least 20.0 sec$^{-1}$ for at least 1.0 min., has a second, lower viscosity below about 1,000 cPs as measured using said viscosity measuring device under specified conditions, and upon removal of said external dynamic strain at said rate, within 10 min., said liquid composition has a third viscosity of within about 99.5% of said initial viscosity when said third viscosity is measured on said viscosity measuring device at said specified conditions; and
  said liquid composition is an aqueous, continuous single phase, non-electrolytic, non-toxic, biodegradable, neutral pH composition, with the proviso that the composition does not include a water insoluble liquid and with the proviso that the composition is not an emulsion.

16. The composition of claim 15 wherein:
  in component (a) the water is present in between about 40 and 86 percent by weight of a combined weight of water and freezing point depressant;
  in component (b) the freezing point depressant is present in between about 14 and 60 percent by weight of said combined water and freezing point depressant; and
  in component (c) the thickener is present in between about 0.01 and 10 percent by weight of the total composition, and the sum of components (a), (b) and (c) are at least about 90% by weight of the total composition.

17. The composition of claim 15 wherein in component (c) the thickener is a xanthan selected from a group of bacterium-progenated heteropolysaccharide hydrophilic colloids, produced in-vitro by controlled aerobic fermentation by bacteria strains of a genus xanthomonas selected from the group consisting of *Xanthomonas campestris, Xanthomonas incanae, Xanthomonas malracearum* R-2, and *Xanthomonas begoniae* S-9.

18. The anti-icing or deicing composition of claim 17 wherein:
  in component (b), the freezing point depressant is selected from the group consisting of ethanol, 1-propanol, 2-propanol, 1-butanol, 2-butanol, 2-methyl-1-propanol, 2-methyl-2-propanol, 1,2-propylene glycol, 1,3-propylene glycol, 1,4-butylene glycol, 1,3-butylene glycol, 2,3-butylene glycol, glycerol, and mixtures thereof, and the freezing point depressant is present in between about 30 and 60 percent by weight, and
  in component (c), the thickener is a xanthan for imparting viscosity thickening when dispersed or hydrated in the composition, and said xanthan is present in between about 0.01 and 10 percent by weight, and the freezing point depressant is present in between about 30 and 60 percent by weight.

19. An environmentally-friendly anti-icing or deicing composition, wherein said composition comprises:
  (a) water in between about 40 and 86 percent by weight of the sum of water and freezing point depressant;
  (b) at least one non-toxic freezing point depressant selected from the group consisting of monohydric alcohols having from 2 to 6 carbon atoms, polyhydric alcohols having from 3 to 12 carbon atoms, mono methyl or mono ethyl ethers of polyhydric alcohols having from 3 to 12 atoms and mixtures thereof, wherein the amount of freezing point depressant is between about 14 to 60 percent by weight;
  (c) a non-toxic thickener which is a xanthan which produces resultant pseudoplastic flow behavior of the composition which thickener is present in between about 0.01 and 10 percent by weight of the total composition, wherein said thickener is of the type which also provides the composition with properties of non-Newtonian pseudoplastic rheological behavior wherein a near-static viscosity exceeds 20,000 cPs at temperature ranges of between about −30° C. and 0° C. and said viscosity rapidly decreases with moderate increase in shear rate to asymptomatically approach a viscosity of below 600 cps, when a film of the composition is exposed to a dynamic shear at a rate in excess of 20 reciprocal seconds; and
  (d) optionally a corrosion inhibitor which is non-toxic and environmentally benign which is present in between about 0.01 and 0.1 percent by weight of the total composition wherein components (a), (b) and (c) are present and the sum of their combined weight is at least about 90% of the total composition, with the proviso that the composition does not include a water insoluble liquid and with the proviso that the composition is not an emulsion.

20. The anti-icing or deicing composition of claim 18, said composition further includes:
  (e) a monohydric alcohol in an amount sufficient for forming a thin layer on a surface of the composition applied to a structure to be ice protected which alcohol is selected from the group consisting of alcohols having between 8 to 24 carbon atoms.

21. The anti-icing or deicing composition of claim 19 comprising water, 2-propanol, xanthan, and propylene glycol.

22. The anti-icing or deicing composition of claim 19 comprising water, xanthan, and propylene glycol.

23. The composition of claim 20 wherein the composition further includes a liquid aliphatic wax ester as a means for forming a hydrophobic thin layer on an exterior surface of the composition after application to an object to be protected, wherein the liquid wax ester has $C_{16}$ to $C_{24}$ linear fatty saturated or unsaturated acid and $C_{18}$ to $C_{26}$ linear alcohol, having a total of about 40 to 44 carbon atoms in between about 0.01 and 10 weight percent of the total composition.

24. A process for the deicing of an aircraft, wherein said process comprises:

contacting an exterior surface of an aircraft in need of deicing with an effective amount of the composition of claim 19 to anti-ice or deice said aircraft surface.

25. A process of applying an anti-icing or deicing composition to a surface wherein the anti-icing or deicing composition of claim is foamed and immediately applied to a surface to be protected
wherein:
in component (a) the water is present in between about 40 and 80 percent by weight of a combined weight of water and freezing point depressant weights;
in component (b) the freezing point depressant is present in between about 20 and 60 percent by weight of said combined water and freezing point depressant weights; and
in component (c) the thickener is present in between about 0.10 and 0.5 percent by weight of the total composition, and the sum of components (a), (b) and (c) are at least about 90% by weight of the total composition.

26. An environmentally-friendly anti-icing or deicing composition, wherein said anti-icing or deicing composition comprises:
(a) water in between about 40 and 86 percent by weight of a sum of water and freezing point depressant;
(b) a non-toxic freezing point depressant selected from the group consisting of mono hydric alcohols having from 2 to 6 carbon atoms, polyhydric alcohols having from 3 to 12 carbon atoms, monomethyl or monoethyl ethers of polyhydric alcohols having from 3 to 12 atoms and mixtures hereof, wherein the amount of freezing point depressant is between about 14 to 60 percent by weight of the sum of water and freezing point depressant:
(c) a xanthan thickener which is present in between about 0.01 and 10 percent by weight of the total composition; and
(d) optionally a corrosion inhibitor which is non-toxic and environmentally benign which is present in between about 0.01 and 0.1 percent by weight of the total composition, with the proviso that the composition does not include a water insoluble liquid and with the proviso that the composition is not an emulsion.

27. The anti-icing or deicing composition of claim 26, which composition further includes
(e) a monohydric primary alcohol in an amount sufficient to form a thin layer on an exterior surface of the composition applied to a structure to be ice protected, which alcohol is selected from the group consisting of alcohols having between 8 to 16 carbon atoms.

28. The anti-icing or deicing composition of claim 26 wherein:
in component (b), the freezing point depressant is selected from the group consisting of ethanol, 1-propanol, 2-propanol, 1-butanol, 2-butanol, 2-methyl-1-propanol, 2-methyl-2-propanol, propylene glycol, 1,4-butyleneglycol, 1,3-butylene glycol, 2,3-butyleneglycol, glycerol, and mixtures thereof, and the freezing point depressant is between about 30 and 60 percent by weight.

29. The anti-icing or deicing composition of claim 28, wherein the composition further includes a monohydric alcohol in an amount sufficient for forming a thin layer on a surface of the composition applied to the surface to be ice protected, which alcohol is selected from the group of monohydric aliphatic alcohols having between 10 and 16 carbon atoms.

30. The anti-icing or deicing composition of claim 26 comprising water, 2-propanol, xanthan and propylene glycol. composition is not an emulsion.

31. The anti-icing or deicing composition of claim 26 comprising water, xanthan and propylene glycol.

32. An anti-icing or deicing composition of claim 26, wherein:
in component (b) the non-toxic freezing point depressant is selected from the group consisting of propylene glycol, n-propanol, isopropanol, and mixtures thereof, and optionally further includes 1-dodecanol in between about 0.01 and 5.0 weight percent; and
the composition is to be applied to a surface of an aircraft.

33. An anti-icing or deicing composition of claim 26:
wherein in component (b) the non-toxic freezing point depressant is a mixture of propylene glycol present in about 5 to 15 weight percent, and isopropanol about 9 to 45 weight percent, and optionally further includes 1-dodecanol in between about 0.01 and 5.0 weight percent; and
the composition is to be applied to a surface of a motor vehicle.

34. An anti-icing or deicing composition of claim 27 wherein the composition is to be applied to aircraft surfaces, said composition having a near-static viscosity at a shear rate of about 0.1 $\sec^{-1}$ of 20,000 to 75,000 cPs and a shear thinned viscosity at a shear rate greater than 20 $\sec^{-1}$, below 1000 cPs, at a temperature of between about 0° and −20° C.

35. The anti-icing or deicing composition of claim 27 having a near-static viscosity of between about 20,000 to 120,000 cPs at between about 0° and −20° C.

36. An environmentally-friendly anti-icing or deicing composition, said anti-icing or deicing composition consisting essentially of:
(a) water in between about 40 and 60 percent by weight of a sum of water and freezing point depressant;
(b) a non-toxic freezing point depressant selected from the group consisting of mono hydric alcohols having from 2 to 6 carbon atoms, polyhydric alcohols having from 3 to 12 carbon atoms, monomethyl or monoethyl ethers of polyhydric alcohols having from 3 to 12 atoms and mixtures hereof, wherein the amount of freezing point depressant is between about 40 to 60 percent by weight of the sum of water and freezing point depressant;
(c) a xanthan which is present in between about 0.01 and 10 percent by weight of total composition;
(d) optionally a corrosion inhibitor which is non-toxic and environmentally benign which is present in between about 0.01 and 0.1 percent by weight of the total composition; and
(e) optionally a monohydric primary aliphatic unbranched alcohol in an effective amount for forming a thin layer on an exterior surface of the composition applied to a surface to be ice protected, which alcohol is selected from the group consisting of alcohols having between 8 to 24 carbon atoms, with the proviso that the composition does not include a water insoluble liquid and with the proviso that the composition is not an emulsion.

37. The anti-icing or deicing composition of claim 36 wherein a corrosion inhibitor is present.

38. The anti-icing or deicing composition of claim 36 wherein:
in component (b), the freezing point depressant is selected from the group consisting of ethanol, 1-propanol, 2-propanol, 1-butanol, 2-butanol, 2-methyl-1-propanol, 2-methyl-2-propanol, propylene glycol, 1,4-butyleneglycol, 1,3-butylene glycol, 2,3- butyleneglycol, glycerol, and mixtures thereof, and the freezing point depressant is between about 30 and 60 percent by weight.

39. The anti-icing or deicing composition of claim 38, wherein the composition further includes a monohydric primary aliphatic unbranched alcohol forming a thin layer on a surface of the composition applied to a structure to be given ice protection, and as a means of forming an homogenized foam with xanthan thickener, which alcohol is selected from the group consisting of alcohols having between 10 and 18 carbon atoms.

40. The anti-icing or deicing composition of claim 36 consisting essentially of water, 2-propanol, propylene glycol and xanthan.

41. The anti-icing or deicing composition of claim 36 consisting essentially of water, propylene glycol and xanthan.

42. A process to produce the anti-icing or deicing composition of claim 36, which process comprises:

mixing (a), (b), (c), and optionally (d) and (e) immediately prior to application to a surface to be anti-iced or deiced wherein:

in component (a) the water is present in between about 40 and 80 percent by weight of a combined weight of water and freezing point depressant weights;

in component (b) the freezing point depressant is present in between about 20 and 60 percent by weight of said combined water and freezing point depressant weights; and in component (c) the thickener is present in between about 0.10 and 5.0 percent by weight of the total composition, and the sum of components (a), (b) and (c) are at least about 90% by weight of the total composition.

* * * * *

UNITED STATES PATENT AND TRADEMARK OFFICE
CERTIFICATE OF CORRECTION

PATENT NO. : 5,772,912
DATED : June 30, 1998
INVENTOR(S) : Leonard A. Haslim, John Zuk, and Robert T. Lockyer It is certified that error appears in the above-identified patent and that said Letters Patent is hereby corrected as shown below:

On the title page: Item [75] Inventors: should read

-- Leonard A. Haslim, Hayward; John Zuk, San Jose; Robert T. Lockyer, Los Gatos, all of California.

Signed and Sealed this

Twenty-first Day of November, 2000

Attest:

Q. TODD DICKINSON

*Attesting Officer*      *Director of Patents and Trademarks*